(12) United States Patent
Lv et al.

(10) Patent No.: US 11,811,501 B2
(45) Date of Patent: Nov. 7, 2023

(54) CLOCK SYNCHRONIZATION METHOD AND APPARATUS, AND STORAGE MEDIUM

(71) Applicant: HUAWEI TECHNOLOGIES CO., LTD., Shenzhen (CN)

(72) Inventors: Jingfei Lv, Wuhan (CN); Song Liu, Dongguan (CN); Chuan Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 94 days.

(21) Appl. No.: 17/360,059

(22) Filed: Jun. 28, 2021

(65) Prior Publication Data

US 2021/0328696 A1    Oct. 21, 2021

Related U.S. Application Data

(63) Continuation of application No. PCT/CN2019/127235, filed on Dec. 21, 2019.

(30) Foreign Application Priority Data

Dec. 29, 2018  (CN) .......................... 201811645611.6

(51) Int. Cl.
*H04J 3/06* (2006.01)

(52) U.S. Cl.
CPC .......... *H04J 3/0644* (2013.01); *H04J 3/0641* (2013.01); *H04J 3/0658* (2013.01); *H04J 3/0679* (2013.01)

(58) Field of Classification Search
CPC ...... H04J 3/0644; H04J 3/0641; H04J 3/0658; H04J 3/0679; H04J 3/0667; H04J 3/0638; H04J 2203/0023; H04L 7/0016; H04L 7/0037; H04W 40/02
See application file for complete search history.

(56) References Cited

U.S. PATENT DOCUMENTS

| | | | |
|---|---|---|---|
| 9,112,630 B1 | 8/2015 | Mizrahi | |
| 2013/0227172 A1* | 8/2013 | Zheng | ................... H04J 3/0667 709/248 |

(Continued)

FOREIGN PATENT DOCUMENTS

| | | |
|---|---|---|
| CN | 101882990 A | 11/2010 |
| CN | 102035638 A | 4/2011 |

(Continued)

OTHER PUBLICATIONS

Levesque et al, "A Survey of Clock Synchronization Over Packet-Switched Networks", 2016 (Year: 2016).*

(Continued)

*Primary Examiner* — Omer S Mian
(74) *Attorney, Agent, or Firm* — Rimon PC

(57) ABSTRACT

This application discloses a clock synchronization method and apparatus, and related storage medium, and pertains to the field of communications technologies. A network device receives an announce message from a first master clock node and an announce message from a second master clock node; and when an identifier of a first clock source node carried in the announce message of the first master clock node is the same as an identifier of a second clock source node carried in the announce message of the second master clock node, selects a master clock node with a smaller clock deviation from the first master clock node and the second master clock node, and then calibrates a clock of the network device based on time information of the master clock node. The precision of clock synchronization by the network device is improved.

19 Claims, 4 Drawing Sheets

(56) References Cited

U.S. PATENT DOCUMENTS

| | | | |
|---|---|---|---|
| 2016/0294545 A1 | 10/2016 | Wong et al. | |
| 2020/0169345 A1* | 5/2020 | Andersson | H04J 3/0641 |
| 2022/0060310 A1* | 2/2022 | Arai | H04J 3/0667 |

FOREIGN PATENT DOCUMENTS

| | | |
|---|---|---|
| CN | 102820941 A | 12/2012 |
| CN | 103051439 A | 4/2013 |
| CN | 109218007 A | 1/2019 |
| WO | 2017133478 A1 | 8/2017 |
| WO | 2018210277 A1 | 11/2018 |

OTHER PUBLICATIONS

ITU T Telecommunication Standardization Sector of ITUet al., "Precision time protocol telecom profile for frequency synchronization", ITU-T G.8265.1/Y.1365.1,Sep. 13, 2016,total:32pages.

as-dvj-timeSync-0407-v1;as-dvj-timeSync-0407-v1 IEEE Draft; as DVJ-TIMESYNC-0407-V1 IEEE SA, Piscataway NJ USA,total:57pages.

IEEE Std 1588-2008, IEEE Standards Interpretations for IEEE Std 1588—2008 IEEE Standard for a Precision Clock Synchronization Protocol for Networked Measurement and ControlSystems, Dec. 2011, 29 pages.

ITU-T G.8275.1/Y.1369.1, Series G: Transmission Systems and Media, Digital Systems and Networks, Packet over Transport aspects Synchronization, quality and availability targets, Series Y: Global Information Infrastructure, Internet Protocol Aspects and Next-Generation Networks, Internet of Things and Smart Cities, Internet protocol aspects Transport Precision time protocol telecom profile for phase/time synchronization with full timing support from the network, Jun. 2016, 56 pages.

* cited by examiner

CLOCK SYNCHRONIZATION METHOD AND APPARATUS, AND STORAGE MEDIUM

CROSS-REFERENCE TO RELATED APPLICATIONS

This application is a continuation of International Application No. PCT/CN2019/127235, filed on Dec. 21, 2019, which claims priority to Chinese Patent Application No. 201811645611.6, filed on Dec. 29, 2018. The disclosures of the aforementioned applications are hereby incorporated by reference in their entireties.

TECHNICAL FIELD

This application relates to the field of communications technologies, and in particular, to a clock synchronization method and apparatus, and related storage medium.

BACKGROUND

With continuous development of telecommunication technologies, a telecommunication network imposes increasingly high requirements on the precision of clock synchronization. More and more precise clock synchronization protocols have emerged as a result. The G.8275.1 protocol is a protocol that is defined by the international telecommunication union—telecommunication standardization sector (ITU-T) based on the IEEE 1588 protocol and is applicable to telecommunication application. The G.8275.1 protocol clarifies functions in the IEEE 1588 protocol that are necessary for interoperability between clock nodes in a clock synchronization network. At least one clock source node and a plurality of clock nodes are usually included in a clock synchronization network that complies with the G.8275.1 protocol. Any one of the plurality of clock nodes may be connected to one or more upstream network devices. In this case, the upstream network device may be referred to as a master clock node. If the clock node is connected to a plurality of master clock nodes, one master clock node usually needs to be selected from the plurality of master clock nodes to perform clock synchronization.

The G.8275.1 protocol defines a selection algorithm for a master clock node. The selection algorithm may also be referred to as an alternative-best master clock algorithm (A-BMCA). When one clock node is connected to a plurality of master clock nodes, the clock node receives a plurality of announce messages respectively from the plurality of master clock nodes. Each announce message carries a clock grade, clock precision, a clock variance, a second priority, a local clock priority, and a clock source node identifier of an upstream clock source node of a master clock node, and a hop count from the master clock node to the upstream clock source node. Fields such as clock grades, clock precision, clock variances, second priorities, and local clock priorities carried in different received announce messages are compared using the A-BMCA. If the preceding fields carried in one announce message are the same as the preceding fields carried in another announce message, it may be determined whether the clock grades carried in the different received announce messages are less than or equal to 127. If the clock grades in the different announce messages are all less than or equal to 127, hop counts from the plurality of master clock nodes to the upstream clock source node are compared, and a master clock node corresponding to a smaller hop count is selected to perform clock synchronization. If the clock grades are all greater than 127, it may be determined whether clock source node identifiers carried in the received announce messages are the same. If the clock source node identifiers are the same, hop counts from the plurality of master clock nodes to the upstream clock source node are compared, and a master clock node corresponding to a smaller hop count is selected to perform clock synchronization. However, selecting a master clock node by using a hop count is not accurate, thereby reducing the accuracy of clock synchronization.

SUMMARY

This application provides a clock synchronization method and apparatus, and related storage medium, to solve a problem in the related art that the accuracy of selecting a master clock node by a network device is not high, thereby affecting the precision of clock synchronization by the network device. The technical solutions are described as follows:

According to a first aspect, a clock synchronization method is provided, and the method includes: A network device receives an announce message from a first master clock node and an announce message from a second master clock node, where the announce message from the first master clock node carries an identifier of a first clock source node and a first maximum clock deviation accumulated value, and the announce message from the second master clock node carries an identifier of a second clock source node and a second maximum clock deviation accumulated value; the network device compares the identifier of the first clock source node with the identifier of the second clock source node; when the identifier of the first clock source node is the same as the identifier of the second clock source node, the network device selects, from the first master clock node and the second master clock node and based on the first maximum clock deviation accumulated value and the second maximum clock deviation accumulated value, a master clock node for performing clock synchronization; and the network device calibrates a clock of the network device based on time information of the selected master clock node.

It should be noted that the network device may be a device connected to at least two master clock nodes in a clock synchronization network. The announce message is a message defined by the precision time protocol (PTP). The identifier of the first clock source node is an identifier used to uniquely indicate the first clock source node. The identifier of the second clock source node is an identifier used to uniquely indicate the second clock source node. The first maximum clock deviation accumulated value is a sum of a plurality of first maximum clock deviations on a path from the first clock source node to the first master clock node, and the second maximum clock deviation accumulated value is a sum of a plurality of second maximum clock deviations on a path from the second clock source node to the second master clock node. The calibrating a clock of the network device comprises setting a parameter of the clock of the network device to be the same as a parameter of a clock of the selected master clock node. The parameter of the clock may be a time of the clock, a frequency of the clock, or a time and a frequency of the clock.

In an embodiment of this application, the network device may first compare the identifier of the first clock source node with the identifier of the second clock source node. When the identifier of the first clock source node is the same as the identifier of the second clock source node, it indicates that the first master clock node and the second master clock node correspond to a same clock source node. In this case, the network device selects, from the first master clock node and the second master clock node and based on the first maximum clock deviation accumulated value and the second maximum clock deviation accumulated value, the master clock node for performing clock synchronization. The network device calibrates the clock of the network device based on the time information of the selected master clock node.

Optionally, the announce message from the first master clock node further carries a clock grade of the first clock source node, and the announce message from the second master clock node further carries a clock grade of the second clock source node. Before the network device compares the identifier of the first clock source node with the identifier of the second clock source node, the method further includes: The network device compares the clock grade of the first clock source node with the clock grade of the second clock source node; and when the clock grade of the first clock source node is equal to the clock grade of the second clock source node, the network device determines whether the clock grade of the first clock source node is less than or equal to 127. When the clock grade of the first clock source node is greater than 127, the network device compares the identifier of the first clock source node with the identifier of the second clock source node.

It should be noted that a clock grade of a clock source node is used to indicate a clock stratum of the clock source node, and a smaller value of the clock grade of the clock source node corresponds to a higher clock stratum of the clock source node. When the clock grade of the first clock source node is equal to the clock grade of the second clock source node, it indicates that a clock stratum of the first clock source node is the same as a clock stratum of the second clock source node. In this case, it may be further determined whether the clock grade of the first clock source node is less than or equal to 127. Because the clock grade of the first clock source node is equal to the clock grade of the second clock source node, determining whether the clock grade of the first clock source node is less than or equal to 127 is equivalent to determining whether the clock grade of the second clock source node is less than or equal to 127. In a possible implementation, when the clock grade of the first clock source node is greater than 127, it indicates that the first clock source node not only can be used as a clock source node tracked by another slave clock node, but also can be used as a slave clock node for tracking another clock source node. Likewise, when the clock grade of the second clock source node is greater than 127, it indicates that the second clock source node not only can be used as a clock source node tracked by another slave clock node, but also can be used as a slave clock node for tracking another clock source node.

Optionally, after the network device determines whether the clock grade of the first clock source node is less than or equal to 127, the method further includes: When the clock grade of the first clock source node is less than or equal to 127, the network device selects, from the first master clock node and the second master clock node and based on the first maximum clock deviation accumulated value and the second maximum clock deviation accumulated value, the master clock node for performing clock synchronization; and the network device calibrates the clock of the network device based on the time information of the selected master clock node.

It should be noted that, when the clock grade of the first clock source node is less than or equal to 127, it indicates that the first clock source node can only be used as a clock source node tracked by another slave clock node, but cannot be used as a slave clock node for tracking another clock source node. Likewise, when the clock grade of the second clock source node is less than or equal to 127, it indicates that the second clock source node can only be used as a clock source node tracked by another slave clock node, but cannot be used as a slave clock node for tracking another clock source node.

In some embodiments, the plurality of first maximum clock deviations are a plurality of maximum clock deviations respectively corresponding to a plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node.

It should be noted that there may be a plurality of paths between the first clock source node and the first master clock node, and the plurality of clock nodes on the path from the first clock source node to the first master clock node may be a plurality of clock nodes on the plurality of paths. Similarly, there may be a plurality of paths between the second clock source node and the second master clock node, and the plurality of clock nodes on the path from the second clock source node to the second master clock node may be a plurality of clock nodes on the plurality of paths. In addition, the plurality of clock nodes on the path from the first clock source node to the first master clock node may include the first master clock node, but do not include the first clock source node. Similarly, the plurality of clock nodes on the path from the second clock source node to the second master clock node may include the second master clock node, but do not include the second clock source node.

Optionally, that the network device selects, from the first master clock node and the second master clock node based on the first maximum clock deviation accumulated value and the second maximum clock deviation accumulated value, a master clock node for performing clock synchronization includes: The network device compares the first maximum clock deviation accumulated value with the second maximum clock deviation accumulated value; and when the first maximum clock deviation accumulated value is less than the second maximum clock deviation accumulated value, the network device determines the first master clock node as the master clock node for performing clock synchronization.

It should be noted that the first maximum clock deviation accumulated value is compared with the second maximum clock deviation accumulated value. When the first maximum clock deviation accumulated value is less than the second maximum clock deviation accumulated value, it indicates that the precision of performing clock synchronization by using the first master clock node is higher than the precision of performing clock synchronization by using the second master clock node. In this case, the network device determines the first master clock node as the master clock node for performing clock synchronization, so that the precision of performing clock synchronization by the network device can be higher. When the first maximum clock deviation accumulated value is greater than the second maximum clock deviation accumulated value, it indicates that the precision of performing clock synchronization by using the second master clock node is higher than the precision of performing clock synchronization by using the first master clock node. In this case, the network device may determine the second master clock node as the master clock node for performing clock synchronization, so that the precision of performing clock synchronization by the network device can be higher.

In an embodiment of this application, a smaller clock deviation on a path from a clock source node to a master clock node indicates higher precision of performing clock synchronization by using the master clock node. Therefore, the first maximum clock deviation accumulated value of the first master clock node may be compared with the second maximum clock deviation accumulated value of the second master clock node, and a master clock node corresponding to a smaller one of the first maximum clock deviation accumulated value and the second maximum clock deviation accumulated value is selected as a master clock node for performing clock synchronization by the network device, so that the precision of performing clock synchronization by the network device can be higher. In this way, the precision of the calibrated clock of the network device is higher.

Optionally, the announce message from the first master clock node further carries a first clock variance value, and the announce message from the second master clock node further carries a second clock variance value. After the network device compares the first maximum clock deviation accumulated value with the second maximum clock deviation accumulated value, the method further includes: When the first maximum clock deviation accumulated value is equal to the second maximum clock deviation accumulated value, the network device compares the first clock variance value with the second clock variance value; and when the first clock variance value is less than the second clock variance value, the network device determines the first master clock node as the master clock node for performing clock synchronization.

It should be noted that the first clock variance value is a square root of a quadratic sum of a plurality of first clock deviation variance values. The second clock variance value is a square root of a quadratic sum of a plurality of second clock deviation variance values. The first clock deviation variance value is a variance value of a plurality of clock deviations corresponding to one clock node on the path from the first clock source node to the first master clock node. The second clock deviation variance value is a variance value of a plurality of clock deviations corresponding to one clock node on the path from the second clock source node to the second master clock node.

In some embodiments of this application, when the first clock variance value is less than the second clock variance value, it indicates that the precision of performing clock synchronization by using the first master clock node is higher than the precision of performing clock synchronization by using the second master clock node. In this case, the network device determines the first master clock node as the master clock node for performing clock synchronization, so that the precision of performing clock synchronization by the network device can be higher. Similarly, when the first clock variance value is greater than the second clock variance value, it indicates that the precision of performing clock synchronization by using the second master clock node is higher than the precision of performing clock synchronization by using the first master clock node. In this case, the network device may determine the second master clock node as the master clock node for performing clock synchronization, so that the precision of performing clock synchronization by the network device can be higher.

In some embodiments, the plurality of first maximum clock deviations are a plurality of maximum clock deviations respectively corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

It should be noted that, one pair of adjacent clock nodes on the path from the first clock source node to the first master clock node are two clock nodes that may directly exchange an announce message on the path from the first clock source node to the first master clock node. Similarly, one pair of adjacent clock nodes on the path from the second clock source node to the second master clock node are two clock nodes that may directly exchange an announce message on the path from the second clock source node to the second master clock node.

Optionally, that the network device selects, from the first master clock node and the second master clock node based on the first maximum clock deviation accumulated value and the second maximum clock deviation accumulated value, a master clock node for performing clock synchronization includes: The network device determines a third maximum clock deviation accumulated value and a fourth maximum clock deviation accumulated value, and the network device compares the third maximum clock deviation accumulated value with the fourth maximum clock deviation accumulated value; and when the third maximum clock deviation accumulated value is less than the fourth maximum clock deviation accumulated value, the network device determines the first master clock node as the master clock node for performing clock synchronization.

It should be noted that the third maximum clock deviation accumulated value is a sum of a maximum clock deviation corresponding to a transmission medium between the first master clock node and the network device and the first maximum clock deviation accumulated value. The fourth maximum clock deviation accumulated value is a sum of a maximum clock deviation corresponding to a transmission medium between the second master clock node and the network device and the second maximum clock deviation accumulated value.

In some embodiments of this application, when the third maximum clock deviation accumulated value is less than the fourth maximum clock deviation accumulated value, it indicates that the precision of performing clock synchronization by using the first master clock node is higher than the precision of performing clock synchronization by using the second master clock node. In this case, the network device determines the first master clock node as the master clock node for performing clock synchronization, so that the precision of performing clock synchronization by the network device can be higher. When the third maximum clock deviation accumulated value is greater than the fourth maximum clock deviation accumulated value, it indicates that the precision of performing clock synchronization by using the second master clock node is higher than the precision of performing clock synchronization by using the first master clock node. In this case, the network device determines the second master clock node as the master clock node for performing clock synchronization, so that the precision of performing clock synchronization by the network device can be higher.

Optionally, the announce message from the first master clock node further carries a first clock variance value, and the announce message from the second master clock node further carries a second clock variance value. The first clock variance value is a square root of a quadratic sum of a plurality of first clock deviation variance values, and the second clock variance value is a square root of a quadratic sum of a plurality of second clock deviation variance values. The plurality of first clock deviation variance values include a variance value of a plurality of clock deviations corresponding to each clock node on the path from the first clock source node to the first master clock node, and a variance value of a plurality of clock deviations corresponding to a transmission medium between each pair of adjacent clock nodes in the at least one pair of adjacent clock nodes in the plurality of clock nodes on the path from the first clock source node to the first master clock node, and the plurality of second clock deviation variance values include a variance value of a plurality of clock deviations corresponding to each clock node on the path from the second clock source node to the second master clock node, and a variance value of a plurality of clock deviations corresponding to a transmission medium between each pair of adjacent clock nodes in the at least one pair of adjacent clock nodes in the plurality of clock nodes on the path from the second clock source node to the second master clock node. After the network device compares the third maximum clock deviation accumulated value with the fourth maximum clock deviation accumulated value, the method further includes: When the third maximum clock deviation accumulated value is equal to the fourth maximum clock deviation accumulated value, the network device determines a third clock variance value and a fourth clock variance value, and the network device compares the third clock variance value with the fourth clock variance value; and when the third clock variance value is less than the fourth clock variance value, the network device determines the first master clock node as the master clock node for performing clock synchronization.

It should be noted that the third clock variance value is a square root of a quadratic sum of a variance value of a plurality of clock deviations corresponding to the transmission medium between the first master clock node and the network device and the first clock variance value. The fourth clock variance value is a square root of a quadratic sum of a variance value of a plurality of clock deviations corresponding to the transmission medium between the second master clock node and the network device and the second clock variance value.

In some embodiments of this application, when the third clock variance value is less than the fourth clock variance value, it indicates that the precision of performing clock synchronization by using the first master clock node is higher than the precision of performing clock synchronization by using the second master clock node. In this case, the network device determines the first master clock node as the master clock node for performing clock synchronization, so that the precision of performing clock synchronization by the network device can be higher. Similarly, when the third clock variance value is greater than the fourth clock variance value, it indicates that the precision of performing clock synchronization by using the second master clock node is higher than the precision of performing clock synchronization by using the first master clock node. In this case, the network device determines the second master clock node as the master clock node for performing clock synchronization, so that the precision of performing clock synchronization by the network device can be higher.

According to a second aspect, a clock synchronization apparatus is provided, and the clock synchronization apparatus has a function of implementing behavior of the clock synchronization method in the first aspect. The clock synchronization apparatus includes at least one module, and the at least one module is configured to implement the clock synchronization method provided in the first aspect.

According to a third aspect, a clock synchronization apparatus is provided. A structure of the clock synchronization apparatus includes a processor and a memory. The memory is configured to: store a program that supports the clock synchronization apparatus in performing the clock synchronization method provided in the first aspect, and store data used to implement the clock synchronization method in the first aspect. The processor is configured to execute the program stored in the memory. The clock synchronization apparatus may further include a communications bus, and the communications bus is configured to establish a connection between the processor and the memory.

According to a fourth aspect, a computer-readable storage medium is provided. The computer-readable storage medium stores an instruction, and when the instruction runs on a computer, the computer is enabled to perform the clock synchronization method in the first aspect.

According to a fifth aspect, a computer program product including an instruction is provided. When the computer program product runs on a computer, the computer is enabled to perform the clock synchronization method in the first aspect.

Technical effects obtained in the second aspect, the third aspect, the fourth aspect, and the fifth aspect are similar to the technical effects obtained by using the corresponding technical means in the first aspect. Details are not described herein again.

The technical solutions provided in this application can bring at least the following beneficial effects: The network device first receives an announce message from the first master clock node and an announce message from the second master clock node. The announce message from the first master clock node carries the identifier of the first clock source node and the first maximum clock deviation accumulated value, and the announce message from the second master clock node carries the identifier of the second clock source node and the second maximum clock deviation accumulated value. Then, the network device compares the identifier of the first clock source node with the identifier of the second clock source node. When the identifier of the first clock source node is the same as the identifier of the second clock source node, it indicates that the first master clock node and the second master clock node correspond to a same clock source node. In this case, a master clock node with a smaller clock deviation on a path from a clock source node to the master clock node is selected from the first master clock node and the second master clock node based on the first maximum clock deviation accumulated value and the second maximum clock deviation accumulated value, and then the clock of the network device is calibrated based on time information of the selected master clock node. A smaller clock deviation on a path from a clock source node to a master clock node indicates higher precision of performing clock synchronization by using the master clock node, so that the precision of the calibrated clock of the network device is higher.

DESCRIPTION OF EMBODIMENTS

To make the objectives, technical solutions, and advantages of this application clearer, the following further describes the implementations of this application in detail with reference to the accompanying drawings.

Before the embodiments of this application are described in detail, an implementation environment of the embodiments of this application is first described.

Figure 1:
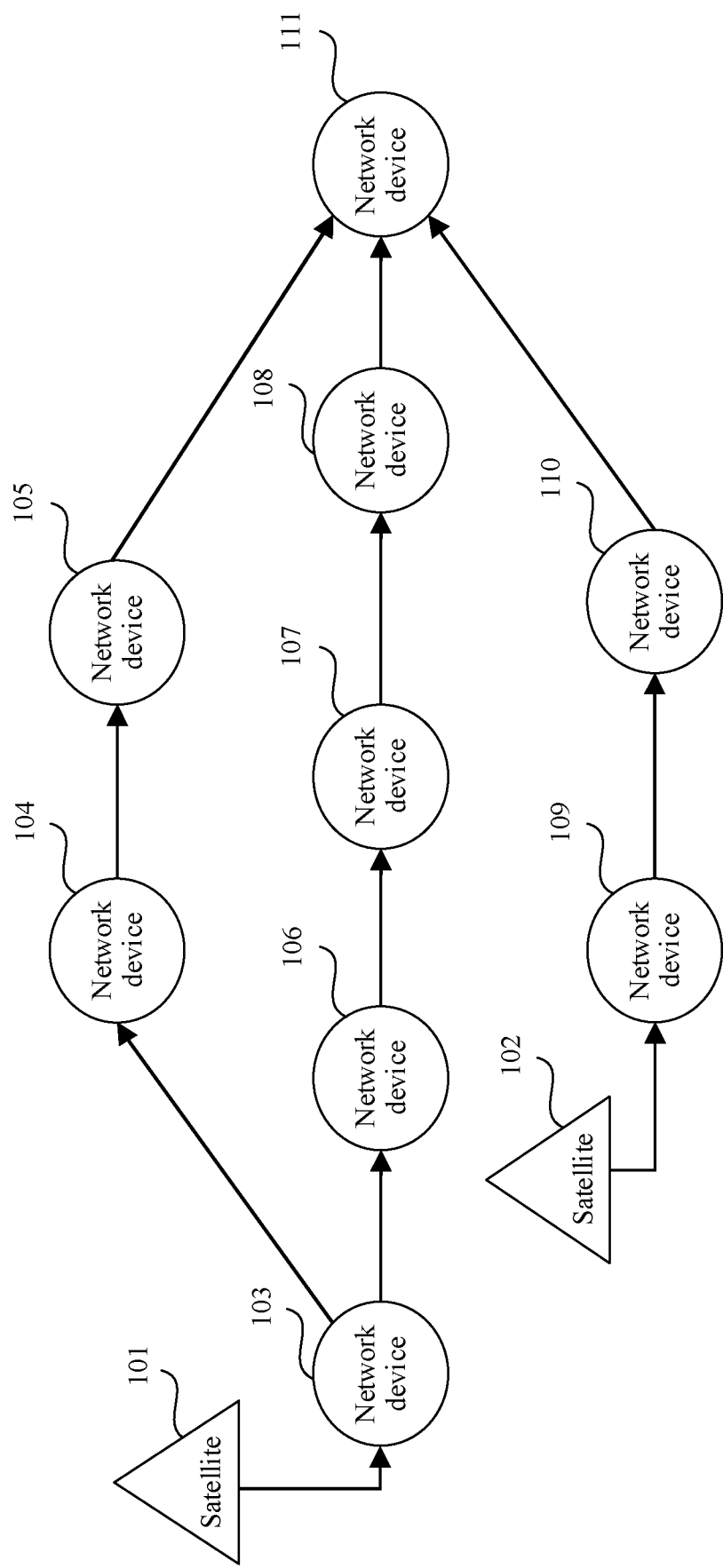
FIG. 1 is a schematic diagram of an implementation environment according to an embodiment of this application.

FIG. 1 is a schematic diagram of an implementation environment according to an embodiment of this application. Referring to FIG. 1, the implementation environment includes a satellite 101, a satellite 102, and a network device 103 to a network device 111. The satellite 101, the satellite 102, and the network device 103 to the network device 111 form a clock synchronization network. The satellite 101 transmits time information to the network device 103 by using a satellite signal, the satellite 102 transmits time information to the network device 109 by using a satellite signal, and the network device 103 to the network device 111 may be connected by using an optical fiber and transmit time information by using the optical fiber. The satellite 101 and the satellite 102 each may be a global positioning system (GPS), a global navigation satellite system (GLONASS), a Beidou navigation satellite system, or the like. The network device 103 to the network device 111 each may be a provider router, a provider edge router, a customer edge router, or the like.

The satellite 101 and the satellite 102 are located upstream of the clock synchronization network, and the network device 111 is located downstream of the clock synchronization network. The satellite 101 may implement clock synchronization with the network device 103 by sending a clock signal to the network device 103. Similarly, the satellite 102 may implement clock synchronization with the network device 109 by sending a clock signal to the network device 109.

The satellite 101 and the network device 103 are used as an example. When the satellite 101 is a GPS, the satellite 101 may include an atomic clock. The network device 103 may include a building integrated timing supply (BITS) clock, and the BITS clock includes a GPS receiver. Driven by the atomic clock, the satellite 101 may send a GPS signal to the network device 103. The GPS signal may include time information whose precision is the same as that of the atomic clock. After receiving the GPS signal, the GPS receiver of the BITS clock in the network device 103 may perform clock synchronization between the BITS clock in the network device 103 and the atomic clock in the GPS satellite based on the time information in the GPS signal. The clock synchronization includes time synchronization and frequency synchronization. Therefore, the network device 103 may synchronize a time of the BITS clock in the network device 103 with a time of the atomic clock in the GPS satellite, and the network device 103 may synchronize a frequency of the BITS clock in the network device 103 with a frequency of the atomic clock in the GPS satellite. After the network device 103 performs clock synchronization with the satellite 101, the network device 103 may be used as a time source node. Similarly, clock synchronization may be performed between the network device 109 and the satellite 102 by using the foregoing method, and the network device 109 after the clock synchronization is used as another clock source node.

As the time source node, the network device 103 may perform clock synchronization between the network device 104 and the network device 106 that are located downstream of the network device 103, and the network device 103. Specifically, the network device 103 and the network device 104 are used as an example. The network device 103 may send a synchronization (Sync) message to the network device 104 located downstream of the network device 103, and a timestamp 1 indicating a sending time of the Sync message is recorded in the Sync message. When the network device 104 receives the Sync message, the network device 104 locally records a timestamp 2 indicating a receiving time of the Sync message, then the network device 104 sends a delay request (delay req) message to the network device 103, and the network device 104 locally records a timestamp 3 indicating a sending time of the delay req message. When the network device 103 receives the delay_req message, the network device 103 locally records a timestamp 4 indicating a receiving time of the Delay_req message, and finally the network device 103 generates a delay response (delay_resp) message carrying the timestamp 4 and sends the delay_resp message to the network device 104. In this case, the network device 104 may obtain the timestamp 1 of sending the Sync message by the network device 103, the timestamp 2 of receiving the Sync message by the network device 104, the timestamp 3 of sending the Delay_req message by the network device 104, and the timestamp 4 of receiving the Delay_req message by the network device 103. The network device 104 may determine a frequency deviation between the network device 104 and the network device 103 by using the timestamp 1 and the timestamp 2, and perform frequency synchronization with the network device 103 based on the frequency deviation. The network device 104 may determine a time deviation between the network device 104 and the network device 103 by using the timestamp 1, the timestamp 2, the timestamp 3, and the timestamp 4, and perform time synchronization with the network device 103 based on the time deviation. In this way, clock synchronization with the network device 103 is implemented.

Similarly, after the network device 104 performs clock synchronization with the network device 103, the network device 104 may be used as a master clock node, so that the network device 105 located downstream of the network device 104 performs clock synchronization with the network device 104, and so on.

The network device 111 is located downstream of the network device 105, the network device 108, and the network device 110. Therefore, the network device 105, the network device 108, and the network device 110 may all be used as master clock nodes of the network device 111. The network device 111 may receive three announce messages from the network device 105, the network device 108, and the network device 110. The three announce messages each carry an identifier of an upstream clock source node of a master clock node, a maximum clock deviation accumulated value of the master clock node, and a hop count from the master clock node to the upstream clock source node. That is, an announce message sent by the network device 105 carries an identifier of the network device 103, a maximum clock deviation accumulated value of the network device 105, and a hop count from the network device 105 to the network device 103, an announce message sent by the network device 108 carries the identifier of the network device 103, a maximum clock deviation accumulated value of the network device 108, and a hop count from the network device 108 to the network device 103, and an announce message sent by the network device 110 carries an identifier of the network device 109, a maximum clock deviation accumulated value of the network device 110, and a hop count from the network device 110 to the network device 109. The network device 111 may select, from the network device 105, the network device 108, and the network device 110 based on data carried in the three announce messages, a network device to perform clock synchronization. Then, similarly, clock synchronization between the network device 111 and the network device that is selected to perform clock synchronization may be implemented based on a process of performing clock synchronization between the network device 104 and the network device 103.

Figure 2:
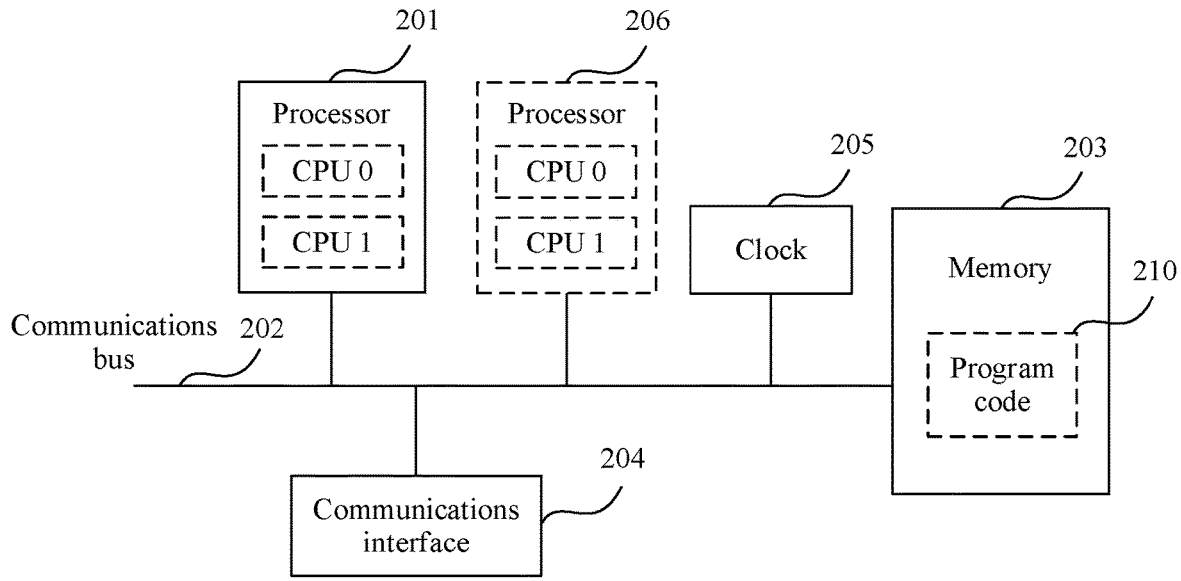
FIG. 2 is a schematic structural diagram of a network device according to an embodiment of this application.

FIG. 2 is a schematic structural diagram of a network device according to an embodiment of this application. The network device may be any one of the network device 103 to the network device 111 shown in FIG. 1. In referring to FIG. 2, the network device includes at least one processor 201, a communications bus 202, a memory 203, at least one communications interface 204, and a clock 205.

The processor 201 may be a general-purpose central processing unit (CPU), a microprocessor, an application-specific integrated circuit (ASIC), or one or more integrated circuits configured to control program execution in the solutions of this application.

The communications bus 202 may include a channel used to transmit information between the foregoing components.

The memory 203 may be a read-only memory (ROM) or another type of static storage device capable of storing static information and an instruction, or may be a random access memory (RAM) or another type of dynamic storage device capable of storing information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by the network device. However, the memory 203 is not limited thereto. The memory 203 may exist independently, and is connected to the processor 201 through the communications bus 202. Alternatively, the memory 203 may be integrated with the processor 201.

The communications interface 204 is any apparatus such as a transceiver, and configured to communicate with another device or a communications network such as the Ethernet, a radio access network (RAN), or a wireless local area network (WLAN).

The clock 205 may be a BITS clock, and the BITS clock may include a GPS receiver.

During specific implementation, in an embodiment, the processor 201 may include one or more CPUs, for example, a CPU 0 and a CPU 1 shown in FIG. 2.

During specific implementation, in an embodiment, the network device may include a plurality of processors, for example, the processor 201 and a processor 206 shown in FIG. 2. Each of these processors may be a single-core processor (single-CPU), or may be a multi-core processor (multi-CPU). The processor herein may be one or more devices, circuits, and/or processing cores configured to process data.

In a specific implementation, in an embodiment, the network device may further include an output device 207 and an input device 208 (not shown in the figure). The output device 207 communicates with the processor 201, and may display information in a plurality of manners. For example, the output device 207 may be a liquid crystal display (LCD), a light emitting diode (LED) display device, a cathode ray tube (CRT) display device, or a projector. The input device 208 communicates with the processor 201, and may receive user input in a plurality of manners. For example, the input device 208 may be a mouse, a keyboard, a touchscreen device, or a sensor device.

The network device may be a general-purpose network device or a dedicated network device. In some implementations, the network device may be a router, a switch, or the like. The type of the network device is not limited in this application.

The memory 203 is configured to store program code 210 for executing the solutions of this application, and the processor 201 is configured to execute the program code 210 stored in the memory 203. The network device may implement, by using the processor 201 and the program code 210 in the memory 203, the clock synchronization method provided in the following embodiment in FIG. 3.

Figure 3:
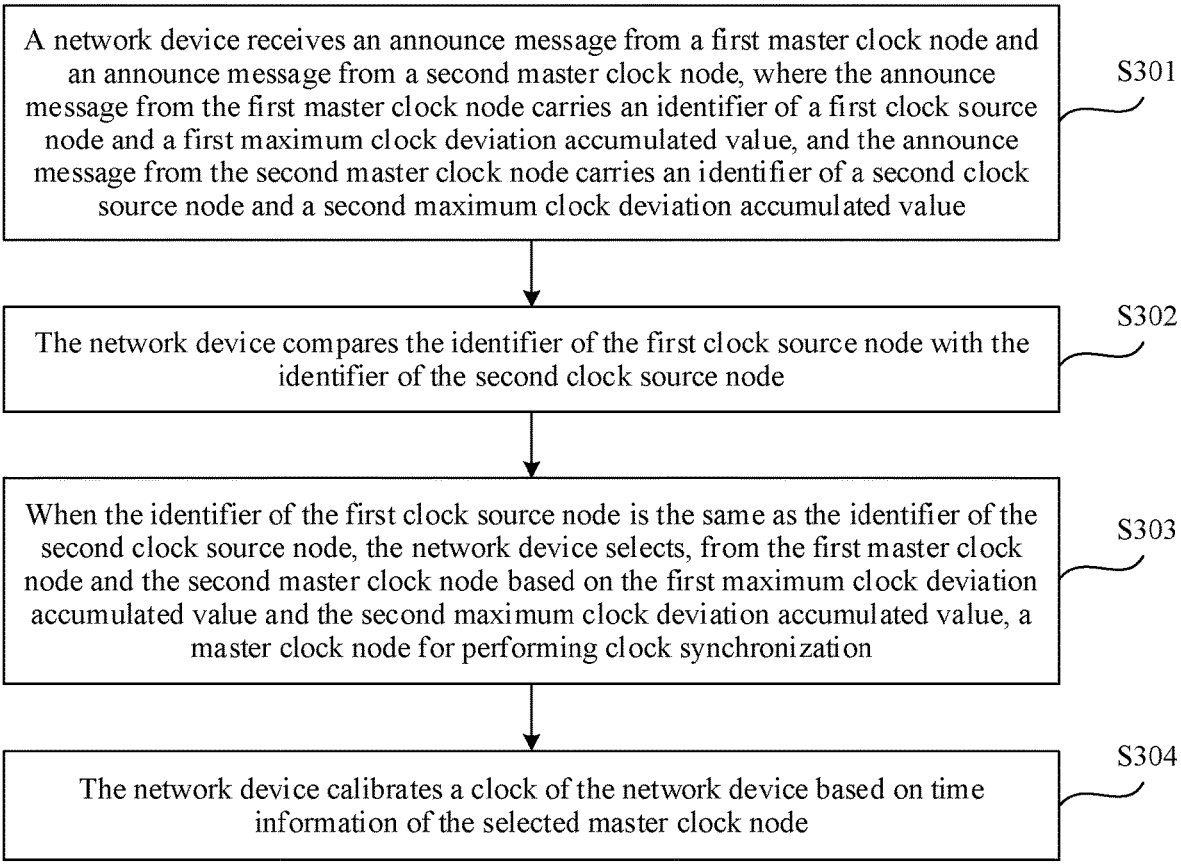
FIG. 3 is a flowchart of a first clock synchronization method according to an embodiment of this application.

FIG. 3 is a flowchart of a first clock synchronization method according to an embodiment of this application. The method is applied to a network device. Referring to FIG. 3, the method includes the following steps.

S301: A network device receives an announce message from a first master clock node and an announce message from a second master clock node, where the announce message from the first master clock node carries an identifier of a first clock source node and a first maximum clock deviation accumulated value, and the announce message from the second master clock node carries an identifier of a second clock source node and a second maximum clock deviation accumulated value.

It should be noted that the network device may be a device connected to at least two master clock nodes in a clock synchronization network. For example, the network device may be the network device 111 in FIG. 1. The first master clock node and the second master clock node are clock nodes that are connected to the network device and located upstream of the network device. The announce message may be a PTP-defined message. The identifier of the first clock source node is an identifier used to uniquely indicate the first clock source node. The identifier of the second clock source node is an identifier used to uniquely indicate the second clock source node.

In addition, the first maximum clock deviation accumulated value is a sum of a plurality of first maximum clock deviations on a path from the first clock source node to the first master clock node. The second maximum clock deviation accumulated value is a sum of a plurality of second maximum clock deviations on a path from the second clock source node to the second master clock node.

In a first case, on a path from a clock source node to a master clock node, a clock deviation may exist only in a clock node. Therefore, the plurality of first maximum clock deviations may be a plurality of maximum clock deviations respectively corresponding to a plurality of clock nodes on the path from the first clock source node to the first master clock node. The plurality of second maximum clock deviations may be a plurality of maximum clock deviations respectively corresponding to a plurality of clock nodes on the path from the second clock source node to the second master clock node. In other words, each clock node on the path from the first clock source node to the first master clock node corresponds to one maximum clock deviation, and the maximum clock deviation is referred to as a first maximum clock deviation. Similarly, each clock node on the path from the second clock source node to the second master clock node also corresponds to one maximum clock deviation, and the maximum clock deviation is referred to as a second maximum clock deviation.

A clock node usually includes a plurality of master communications interfaces and a plurality of slave communications interfaces. The plurality of slave communications interfaces may respectively communicate with a plurality of master clock nodes according to the G.8275.1 protocol, and the plurality of master communications interfaces may respectively communicate with a plurality of downstream slave clock nodes according to the G.8275.1 protocol. The following uses the plurality of master communications interfaces as an example for description. When one of the plurality of master communications interfaces of the clock node is faulty, a slave clock node that communicates with the master communications interface cannot implement clock synchronization with the clock node using the master communications interface. In this case, the slave clock node needs to communicate with another master communications interface included in the clock node, so that clock synchronization with the clock node can be implemented using the other master communications interface. In this case, the clock node produces a jump amplitude deviation because the slave clock node communicates with the other master communications interface. That is, when the slave clock node communicates with the original master communications interface, the precision of performing clock synchronization between the slave clock node and the clock node is higher than the precision of performing clock synchronization between the slave clock node and the clock node when the slave clock node communicates with another master communications interface. Certainly, when a communications interface of the clock node is not faulty, a clock node that communicates with the communications interface does not need to communicate with another communications interface. Therefore, the jump amplitude deviation is not an inevitable deviation in the clock node. In addition, the clock node inevitably produces a jitter in a natural environment in which the clock node is located due to the natural environment, and consequently produces a jitter deviation. In addition, the clock node inevitably produces a static deviation due to a slow drift in a use process. The jump amplitude deviation, the jitter deviation, and the static deviation of the clock node are all clock deviations. The three clock deviations may be detected at a plurality of different sampling moments before delivery of the clock node, to obtain a maximum value used to evaluate the precision of the clock node. For example, 100 jump amplitude deviations and 100 jitter deviations at 100 sampling moments may be obtained before delivery of the clock node. A maximum value of the 100 jump amplitude deviations may be taken as a maximum jump amplitude deviation. An absolute value of a difference between an upper limit and a lower limit of a jitter deviation range formed by the 100 jitter deviations may be taken as a maximum jitter deviation. An intermediate value of the jitter deviation range formed by the 100 jitter deviations may be taken as a maximum static deviation. The maximum jump amplitude deviation, the maximum jitter deviation, and the maximum static deviation may be stored in the clock node when the clock node is delivered. When the communications interface of the clock node is faulty and the clock node that communicates with the communications interface needs to communicate with another communications interface, a maximum clock deviation value is a sum of the maximum jump amplitude deviation, the maximum jitter deviation, and the maximum static deviation. When the master communications interface of the clock node does not change, the maximum clock deviation value is a sum of the maximum jitter deviation and the maximum static deviation.

Based on the foregoing descriptions, for each clock node on the path from the first clock source node to the first master clock node, a maximum clock deviation corresponding to the clock node may be the sum of the maximum jump amplitude deviation, the maximum jitter deviation, and the maximum static deviation, or may be the sum of the maximum jitter deviation and the maximum static deviation. Similarly, for each clock node on the path from the second clock source node to the second master clock node, a maximum clock deviation corresponding to the clock node may be the sum of the maximum jump amplitude deviation, the maximum jitter deviation, and the maximum static deviation, or may be the sum of the maximum jitter deviation and the maximum static deviation.

The following describes the first maximum clock deviation accumulated value in the first case using an example.

Taking the network device 111 in FIG. 1 as an example, if a network device 105 is the first master clock node, a network device 103 is the first clock source node. A path from the network device 103 to the network device 105 further includes a network device 104. The network device 104 corresponds to a maximum clock deviation 104, and the network device 105 corresponds to a maximum clock deviation 105. In other words, there are two first maximum clock deviations: the maximum clock deviation 104 and the maximum clock deviation 105 on the path from the network device 103 to the network device 105. Therefore, the first maximum clock deviation accumulated value is a sum of the maximum clock deviation 104 and the maximum clock deviation 105.

It should be noted that there may be a plurality of paths between the first clock source node and the first master clock node, and the plurality of clock nodes on the path from the first clock source node to the first master clock node may be a plurality of clock nodes on the plurality of paths. Similarly, there may be a plurality of paths between the second clock source node and the second master clock node, and the plurality of clock nodes on the path from the second clock source node to the second master clock node may be a plurality of clock nodes on the plurality of paths. In addition, the plurality of clock nodes on the path from the first clock source node to the first master clock node may include the first master clock node, but do not include the first clock source node. Similarly, the plurality of clock nodes on the path from the second clock source node to the second master clock node may include the second master clock node, but do not include the second clock source node.

In a second case, on a path from a clock source node to a master clock node, in addition to a clock deviation in a clock node, a corresponding clock deviation may exist in a transmission medium between two adjacent clock nodes. Therefore, the plurality of first maximum clock deviations may be a plurality of maximum clock deviations respectively corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node. The plurality of second maximum clock deviations may be a plurality of maximum clock deviations respectively corresponding to a plurality of clock nodes on the path from the second clock source node to the second master clock node, and at least one maximum clock deviation corresponding to a transmission medium between at least one pair of adj acent clock nodes in the plurality of clock nodes on the path from the second clock source node to the second master clock node. In other words, each clock node on the path from the first clock source node to the first master clock node corresponds to one maximum clock deviation, and a transmission medium between each pair of adjacent clock nodes in the at least one pair of adjacent clock nodes also corresponds to one maximum clock deviation, which may be referred to as a first maximum clock deviation. Similarly, each clock node on the path from the second clock source node to the second master clock node corresponds to one maximum clock deviation, and a transmission medium between each pair of adjacent clock nodes in the at least one pair of adjacent clock nodes also corresponds to one maximum clock deviation, which may be referred to as a second maximum clock deviation.

It should be noted that, one pair of adjacent clock nodes on the path from the first clock source node to the first master clock node are two clock nodes that may directly exchange an announce message on the path from the first clock source node to the first master clock node. Similarly, one pair of adjacent clock nodes on the path from the second clock source node to the second master clock node are two clock nodes that may directly exchange an announce message on the path from the second clock source node to the second master clock node. For example, the network device 104 and the network device 105 in FIG. 1 may be referred to as one pair of adjacent clock nodes. A transmission medium between adjacent clock nodes may be an optical fiber. Because the optical fiber is affected by factors such as temperature, humidity, and pressure, the amount of delay in performing clock synchronization between one pair of adjacent clock nodes may be affected. Consequently, a clock deviation exists in the transmission medium between adjacent clock nodes.

The following describes the first maximum clock deviation accumulated value in the second case using an example.

Taking the network device 111 in FIG. 1 as an example, if a network device 105 is the first master clock node, a network device 103 is the first clock source node. A path from the network device 103 to the network device 105 further includes a network device 104. The network device 104 corresponds to a maximum clock deviation 104, the network device 105 corresponds to a maximum clock deviation 105, and a transmission medium n between the network device 104 and the network device 105 further corresponds to a maximum clock deviation n. In other words, there are three first maximum clock deviations: the maximum clock deviation 104, the maximum clock deviation 105, and the maximum clock deviation n on the path from the network device 103 to the network device 105. Therefore, the first maximum clock deviation accumulated value is a sum of the maximum clock deviation 104, the maximum clock deviation 105, and the maximum clock deviation n.

It should be noted that, when the transmission medium between each pair of adjacent clock nodes in the plurality of clock nodes on the path from the first clock source node to the first master clock node is in an ideal state, the transmission medium between each pair of adjacent clock nodes does not produce a clock deviation due to factors such as temperature, humidity, and pressure. Under such condition, the plurality of first maximum clock deviations are the plurality of maximum clock deviations respectively corresponding to the plurality of clock nodes on the path from the first clock source node to the first master clock node.

In addition, for a transmission medium between one pair of adjacent clock nodes, a detecting instrument may be disposed at each of the two adjacent clock nodes in advance, to detect a clock deviation produced by forward and reverse transmission time information of the transmission medium between the two clock nodes. Similar to the foregoing clock node, detection may be performed at a plurality of different sampling moments, and then a maximum value of detected clock deviations is taken as a maximum clock deviation of the transmission medium between the two adj acent clock nodes. In addition, the maximum clock deviation of the transmission medium between the two adj acent clock nodes is stored in either one of the two adjacent clock nodes.

S302: The network device compares the identifier of the first clock source node with the identifier of the second clock source node.

It should be noted that, in some implementation environment, all clock nodes in the entire clock synchronization network need to track a same clock source node, so that all the clock nodes in the entire clock synchronization network correspond to a same clock source node. Therefore, the identifier of the first clock source node is first compared with the identifier of the second clock source node to determine whether the clock source nodes of the first master clock node and the second master clock node are the same. If the clock source nodes of the first master clock node and the second master clock node are the same, it can be ensured that all the clock nodes in the clock synchronization network track a same clock source node, and then a master clock node that may perform clock synchronization with the network device is selected by using the following S303.

S303: When the identifier of the first clock source node is the same as the identifier of the second clock source node, the network device selects, from the first master clock node and the second master clock node based on the first maximum clock deviation accumulated value and the second maximum clock deviation accumulated value, a master clock node for performing clock synchronization.

It should be noted that, when the identifier of the first clock source node is the same as the identifier of the second clock source node, it indicates that the first master clock node and the second master clock node correspond to a same clock source node. In this case, a clock source node does not become a factor that affects selection of the master clock node for performing clock synchronization from the first master clock node and the second master clock node by the network device. Therefore, the master clock node for performing clock synchronization may be selected from the first master clock node and the second master clock node based on the first maximum clock deviation accumulated value and the second maximum clock deviation accumulated value.

Based on the foregoing descriptions of S301, concepts of a first maximum clock deviation accumulated value and a second maximum clock deviation accumulated value are different in the two different cases. In this case, an implementation of selecting, from the first master clock node and the second master clock node based on the first maximum clock deviation accumulated value and the second maximum clock deviation accumulated value, the master clock node for performing clock synchronization also varies. Therefore, the following also describes the selection of the master clock node in two possible implementations. A first possible implementation corresponds to the first case in S301, and a second possible implementation corresponds to the second case in S301.

In the first possible implementation, the network device compares the first maximum clock deviation accumulated value with the second maximum clock deviation accumulated value. When the first maximum clock deviation accumulated value is less than the second maximum clock deviation accumulated value, the network device determines the first master clock node as the master clock node for performing clock synchronization. When the first maximum clock deviation accumulated value is greater than the second maximum clock deviation accumulated value, the network device determines the second master clock node as the master clock node for performing clock synchronization.

It should be noted that, when the first maximum clock deviation accumulated value is less than the second maximum clock deviation accumulated value, it indicates that the precision of performing clock synchronization by using the first master clock node is higher than the precision of performing clock synchronization by using the second master clock node. In this case, the network device determines the first master clock node as the master clock node for performing clock synchronization, so that the precision of performing clock synchronization by the network device can be higher. When the first maximum clock deviation accumulated value is greater than the second maximum clock deviation accumulated value, it indicates that the precision of performing clock synchronization by using the second master clock node is higher than the precision of performing clock synchronization by using the first master clock node. In this case, the network device may determine the second master clock node as the master clock node for performing clock synchronization, so that the precision of performing clock synchronization by the network device can be higher.

It should be noted that, if the identifier of the first clock source node is the same as the identifier of the second clock source node, when the first maximum clock deviation accumulated value is equal to the second maximum clock deviation accumulated value, the announce message from the first master clock node may further carry a hop count from the first master clock node to the first clock source node, and the announce message from the second master clock node may further carry a hop count from the second master clock node to the second clock source node. A master clock node for performing clock synchronization by the network device may be selected by comparing the hop count from the first master clock node to the first clock source node with the hop count from the second master clock node to the second clock source node. Because a larger value of the hop count indicates a larger quantity of clock nodes on a path from a master clock node to a clock source node, and the larger quantity of clock nodes brings a larger clock deviation, the precision of performing clock synchronization by using the master clock node is reduced. Therefore, when the hop count from the first master clock node to the first clock source node is less than the hop count from the second master clock node to the second clock source node, it indicates that the precision of performing clock synchronization by using the first master clock node is higher than the precision of performing clock synchronization by using the second master clock node. In this case, the network device may determine the first master clock node as the master clock node for performing clock synchronization. Certainly, when the hop count from the first master clock node to the first clock source node is greater than the hop count from the second master clock node to the second clock source node, it indicates that the precision of performing clock synchronization by using the second master clock node is higher than the precision of performing clock synchronization by using the first master clock node. In this case, the network device may determine the second master clock node as the master clock node for performing clock synchronization.

In the second possible implementation, the network device determines a third maximum clock deviation accumulated value and a fourth maximum clock deviation accumulated value, and compares the third maximum clock deviation accumulated value with the fourth maximum clock deviation accumulated value. When the third maximum clock deviation accumulated value is less than the fourth maximum clock deviation accumulated value, the network device determines the first master clock node as the master clock node for performing clock synchronization. When the third maximum clock deviation accumulated value is greater than the fourth maximum clock deviation accumulated value, the network device determines the second master clock node as the master clock node for performing clock synchronization.

It should be noted that the third maximum clock deviation accumulated value is a sum of a maximum clock deviation corresponding to a transmission medium between the first master clock node and the network device and the first maximum clock deviation accumulated value, and the fourth maximum clock deviation accumulated value is a sum of a maximum clock deviation corresponding to a transmission medium between the second master clock node and the network device and the second maximum clock deviation accumulated value.

Based on the foregoing descriptions of S301, a maximum clock deviation of a transmission medium between two adjacent clock nodes may be stored in any one of the two clock nodes. That is, the maximum clock deviation corresponding to the transmission medium between the first master clock node and the network device may be stored in the first master clock node, or may be stored in the network device. Likewise, the maximum clock deviation corresponding to the transmission medium between the second master clock node and the network device may be stored in the second master clock node, or may be stored in the network device. When the maximum clock deviation corresponding to the transmission medium between the first master clock node and the network device is stored in the first master clock node, and the maximum clock deviation corresponding to the transmission medium between the second master clock node and the network device is stored in the second master clock node, the first clock deviation accumulated value carried in the announce message from the first master clock node includes the maximum clock deviation corresponding to the transmission medium between the first master clock node and the network device, and the second clock deviation accumulated value carried in the announce message from the second master clock node includes the maximum clock deviation corresponding to the transmission medium between the second master clock node and the network device. In this case, the first maximum clock deviation accumulated value may be directly compared with the second maximum clock deviation accumulated value. When the first maximum clock deviation accumulated value is less than the second maximum clock deviation accumulated value, the network device determines the first master clock node as the master clock node for performing clock synchronization. When the first maximum clock deviation accumulated value is greater than the second maximum clock deviation accumulated value, the network device determines the second master clock node as the master clock node for performing clock synchronization.

However, when the maximum clock deviation corresponding to the transmission medium between the first master clock node and the network device is stored in the network device, and the maximum clock deviation corresponding to the transmission medium between the second master clock node and the network device is stored in the network device, the first clock deviation accumulated value carried in the announce message from the first master clock node does not include the maximum clock deviation corresponding to the transmission medium between the first master clock node and the network device, and the second clock deviation accumulated value carried in the announce message from the second master clock node does not include the maximum clock deviation corresponding to the transmission medium between the second master clock node and the network device. In this case, the third maximum clock deviation accumulated value and the fourth maximum clock deviation accumulated value need to be determined, and the third maximum clock deviation accumulated value is compared with the fourth maximum clock deviation accumulated value. When the third maximum clock deviation accumulated value is less than the fourth maximum clock deviation accumulated value, the network device determines the first master clock node as the master clock node for performing clock synchronization. When the third maximum clock deviation accumulated value is greater than the fourth maximum clock deviation accumulated value, the network device determines the second master clock node as the master clock node for performing clock synchronization.

In addition, when the third maximum clock deviation accumulated value is less than the fourth maximum clock deviation accumulated value, it indicates that the precision of performing clock synchronization by using the first master clock node is higher than the precision of performing clock synchronization by using the second master clock node. In this case, the network device determines the first master clock node as the master clock node for performing clock synchronization, so that the precision of performing clock synchronization by the network device can be higher. When the third maximum clock deviation accumulated value is greater than the fourth maximum clock deviation accumulated value, it indicates that the precision of performing clock synchronization by using the second master clock node is higher than the precision of performing clock synchronization by using the first master clock node. In this case, the network device determines the second master clock node as the master clock node for performing clock synchronization, so that the precision of performing clock synchronization by the network device can be higher.

The following describes the third maximum clock deviation accumulated value by using an example.

Taking the network device 111 in FIG. 1 as an example, if a network device 105 is the first master clock node, a network device 103 is the first clock source node. A path from the network device 103 to the network device 105 further includes a network device 104. The network device 104 corresponds to a maximum clock deviation 104, the network device 105 corresponds to a maximum clock deviation 105, a transmission medium n between the network device 104 and the network device 105 further corresponds to a maximum clock deviation n, and a transmission medium m between the network device 105 and the network device 111 corresponds to a maximum clock deviation m. In other words, there are four first maximum clock deviations: the maximum clock deviation 104, the maximum clock deviation 105, the maximum clock deviation n, and the maximum clock deviation m on the path from the network device 103 to the network device 105. Therefore, if the first maximum clock deviation accumulated value is a sum of the maximum clock deviation 104, the first maximum clock deviation 105, and the first maximum clock deviation n, the third maximum clock deviation accumulated value is a sum of the maximum clock deviation m and the first maximum clock deviation accumulated value.

It should be noted that, if the identifier of the first clock source node is the same as the identifier of the second clock source node, when the third maximum clock deviation accumulated value is equal to the fourth maximum clock deviation accumulated value, the announce message from the first master clock node may further carry a hop count from the first master clock node to the first clock source node, and the announce message from the second master clock node may further carry a hop count from the second master clock node to the second clock source node. A master clock node for performing clock synchronization by the network device may be selected by comparing the hop count from the first master clock node to the first clock source node with the hop count from the second master clock node to the second clock source node. Because a larger value of the hop count indicates a larger quantity of clock nodes on a path from a master clock node to a clock source node, and the larger quantity of clock nodes brings a larger clock deviation, the precision of performing clock synchronization by using the master clock node is reduced if a path of a larger hop count is selected. Therefore, when the hop count from the first master clock node to the first clock source node is less than the hop count from the second master clock node to the second clock source node, it indicates that the precision of performing clock synchronization by using the first master clock node is higher than the precision of performing clock synchronization by using the second master clock node. In this case, the network device may determine the first master clock node as the master clock node for performing clock synchronization. Certainly, when the hop count from the first master clock node to the first clock source node is greater than the hop count from the second master clock node to the second clock source node, it indicates that the precision of performing clock synchronization by using the second master clock node is higher than the precision of performing clock synchronization by using the first master clock node. In this case, the network device may determine the second master clock node as the master clock node for performing clock synchronization.

S304: The network device calibrates a clock of the network device based on the time information of the selected master clock node.

It should be noted that, the calibrating a clock of the network device is setting the clock of the network device to be the same as a clock of the selected master clock node, and the clock synchronization may include time synchronization and frequency synchronization.

A specific implementation of S304 may include: The network device communicates with the master clock node according to IEEE1588-2008 by using a PTP message. The PTP message includes a Sync message, a delay_req message, and a delay_resp message. The time information is carried in the PTP message. The time information may be a timestamp 1, a timestamp 2, a timestamp 3, and a timestamp 4. The network device may calculate a time deviation between the network device and the master clock node by using the time information. The network device calibrates a time of the clock of the network device based on the time deviation. Alternatively, the network device may calculate a frequency deviation between the network device and the master clock node by using the time information. The network device calibrates a frequency of the clock of the network device based on the frequency deviation. The network device may calibrate only the time. The network device may calibrate only the frequency. The network device may alternatively calibrate the time and the frequency. For a process in which the network device communicates with the master clock node by using the PTP message, refer to the foregoing descriptions of communicating, by the network device 104, with the network device 103 by using the PTP message. For a process in which the network device obtains the time information, refer to the foregoing description of obtaining the timestamp 1, the timestamp 2, the timestamp 3, and the timestamp 4 by the network device 104.

An example implementation in which the network device calibrates the frequency of the clock of the network device based on the frequency deviation may include: The clock of the network device may include a voltage source and a crystal oscillator. An output voltage of the voltage source acts on the crystal oscillator. A higher output voltage of the voltage source indicates a higher working frequency of the crystal oscillator. The network device may include a central processing unit. The central processing unit may control an output voltage of the voltage source. Further, the central processing unit may calibrate the frequency of the clock of the network device by controlling the output voltage of the voltage source. Specifically, the central processing unit may determine a voltage adjustment value 1 based on the frequency deviation. Specifically, the network device further includes a memory coupled to the central processing unit. The memory may store a correspondence between a frequency deviation and a voltage adjustment value. The central processing unit may search the correspondence for a voltage adjustment value, for example, the voltage adjustment value 1 corresponding to first frequency deviation, by accessing the memory. Before the central processing unit determines the voltage adjustment value 1, the output voltage of the voltage source is a voltage value 1. After determining the voltage adjustment value 1, the central processing unit may adjust the output voltage of the voltage source to a voltage value 2 based on the voltage adjustment value 1. The voltage value 2 is equal to a sum of the voltage value 1 and the voltage adjustment value 1. Therefore, if the voltage adjustment value 1 is a positive number, it indicates that the frequency of the clock of the network device is lower than a frequency of the master clock node. The central processing unit may calibrate the frequency of the clock of the network device by increasing a working frequency of the crystal oscillator. If the voltage adjustment value 1 is a negative number, it indicates that the frequency of the clock of the network device is higher than the frequency of the master clock node. The central processing unit may calibrate the frequency of the clock of the network device by reducing the working frequency of the crystal oscillator.

An example implementation in which the network device calibrates the time of the clock of the network device based on the time deviation may include: The clock of the network device includes a crystal oscillator and a counter. The counter may be an accumulator. The counter may include a memory. A value stored in the memory is equal to a current time recorded by the clock. The crystal oscillator may output one pulse signal to the counter in each working period. When the counter detects a rising edge or a falling edge of the pulse signal, the counter performs an addition operation on an increment and the value stored in the memory, to update the value stored in the memory. The increment is equal to a nominal working period of the crystal oscillator. For example, the nominal working frequency of the crystal oscillator may be 125 megahertz (MHz). Correspondingly, the nominal working period of the crystal oscillator may be 8 nanoseconds. After determining the time deviation, the central processing unit of the network device may update, based on the time deviation, the value stored in the memory included in the counter, to update the time of the clock of the network device. The time of the clock of the network device may be calibrated through the foregoing process.

It should be noted that, in the foregoing technical solution, clock synchronization is performed when the identifier of the first clock source node is the same as the identifier of the second clock source node. However, when the identifier of the first clock source node is different from the identifier of the second clock source node, a master clock node that may perform clock synchronization with the network device may be determined based on values of the identifiers of the two clock source nodes. A smaller identifier of a clock source node indicates higher precision of the clock source node, that is, higher precision of performing clock synchronization with a master clock node corresponding to the clock source node. Therefore, a master clock node corresponding to a clock source node with a smaller identifier in the two clock source nodes may be selected as a master clock node for performing clock synchronization by the network device, so that the precision of performing clock synchronization by the network device is higher. Specifically, when the identifier of the first clock source node is less than the identifier of the second clock source node, it indicates that the precision of performing clock synchronization by using the first master clock node is higher than the precision of performing clock synchronization by using the second master clock node. In this case, the network device may determine the first master clock node as the master clock node for performing clock synchronization. When the identifier of the first clock source node is greater than the identifier of the second clock source node, it indicates that the precision of performing clock synchronization by using the second master clock node is higher than the precision of performing clock synchronization by using the first master clock node. In this case, the network device may determine the second master clock node as the master clock node for performing clock synchronization.

Further, the announce message from the first master clock node may further carry a clock grade of the first clock source node, and the announce message from the second master clock node may further carry a clock grade of the second clock source node. Before S302, that is, before the identifier of the first clock source node is compared with the identifier of the second clock source node, a master clock node to be selected to perform clock synchronization with the network device may be determined by using the following step (1) to step (3), and clock synchronization is performed.

Step (1): The network device compares the clock grade of the first clock source node with the clock grade of the second clock source node. When the clock grade of the first clock source node is equal to the clock grade of the second clock source node, the network device determines whether the clock grade of the first clock source node is less than or equal to 127, and returns to S302 when the clock grade of the first clock source node is greater than 127.

It should be noted that a clock grade of a clock source node is used to indicate a clock stratum of the clock source node, and a smaller value of the clock grade of the clock source node corresponds to a higher clock stratum of the clock source node. When the clock grade of the first clock source node is equal to the clock grade of the second clock source node, it indicates that a clock stratum of the first clock source node is the same as a clock stratum of the second clock source node. In this case, it may be determined whether the clock grade of the first clock source node is less than or equal to 127. Because the clock grade of the first clock source node is equal to the clock grade of the second clock source node, determining whether the clock grade of the first clock source node is less than or equal to 127 is equivalent to determining whether the clock grade of the second clock source node is less than or equal to 127. In a possible implementation, when the clock grade of the first clock source node is greater than 127, it indicates that the first clock source node not only can be used as a clock source node tracked by another slave clock node, but also can be used as a slave clock node for tracking another clock source node. Likewise, when the clock grade of the second clock source node is greater than 127, it indicates that the second clock source node not only can be used as a clock source node tracked by another slave clock node, but also can be used as a slave clock node for tracking another clock source node. Therefore, the network device may return to S302, and continue to compare the identifier of the first clock source node with the identifier of the second clock source node.

Step (2): When the clock grade of the first clock source node is less than or equal to 127, the network device selects, from the first master clock node and the second master clock node and based on the first maximum clock deviation accumulated value and the second maximum clock deviation accumulated value, the master clock node for performing clock synchronization.

It should be noted that, when the clock grade of the first clock source node is less than or equal to 127, it indicates that the first clock source node can only be used as a clock source node tracked by another slave clock node, but cannot be used as a slave clock node for tracking another clock source node. Likewise, when the clock grade of the second clock source node is less than or equal to 127, it indicates that the second clock source node can only be used as a clock source node tracked by another slave clock node, but cannot be used as a slave clock node for tracking another clock source node. Therefore, the network device may select, from the first master clock node and the second master clock node based on the first maximum clock deviation accumulated value and the second maximum clock deviation accumulated value, the master clock node for performing clock synchronization. A process in which the network device selects, from the first master clock node and the second master clock node based on the first maximum clock deviation accumulated value and the second maximum clock deviation accumulated value, the master clock node for performing clock synchronization is similar to the corresponding process in S303, and details are not described herein again.

Step (3): The network device calibrates the clock of the network device based on the time information of the selected master clock node.

It should be noted that step (3) is similar to S304, and details are not described herein again.

In some embodiments of this application, the network device first receives the announce message from the first master clock node and the announce message from the second master clock node. The announce message from the first master clock node carries the identifier of the first clock source node and the first maximum clock deviation accumulated value, and the announce message from the second master clock node carries the identifier of the second clock source node and the second maximum clock deviation accumulated value. Then, the network device compares the identifier of the first clock source node with the identifier of the second clock source node. When the identifier of the first clock source node is the same as the identifier of the second clock source node, it indicates that the first master clock node and the second master clock node correspond to a same clock source node. In this case, a master clock node with a smaller clock deviation on a path from a clock source node to the master clock node is selected from the first master clock node and the second master clock node based on the first maximum clock deviation accumulated value and the second maximum clock deviation accumulated value, and then the clock of the network device is calibrated based on time information of the selected master clock node. A smaller clock deviation on a path from a clock source node to a master clock node indicates higher precision of performing clock synchronization by using the master clock node, so that precision of the calibrated clock of the network device is higher.

Figure 4:
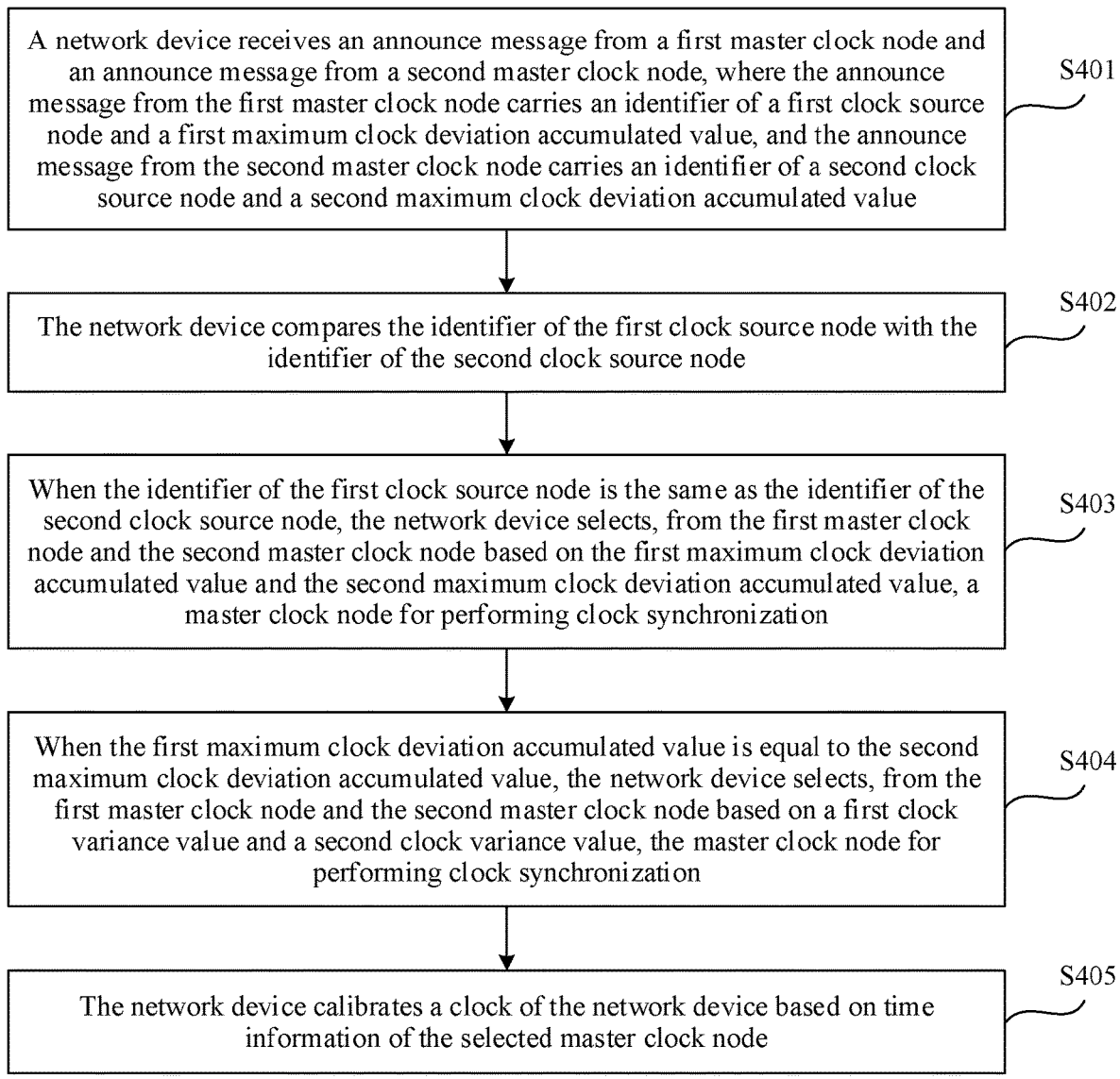
FIG. 4 is a flowchart of a second clock synchronization method according to an embodiment of this application.

FIG. 4 is a flowchart of a second clock synchronization method according to an embodiment of this application. The method is applied to a network device. Referring to FIG. 4, the method includes the following steps.

S401: A network device receives an announce message from a first master clock node and an announce message from a second master clock node, where the announce message from the first master clock node carries an identifier of a first clock source node and a first maximum clock deviation accumulated value, and the announce message from the second master clock node carries an identifier of a second clock source node and a second maximum clock deviation accumulated value.

S402: The network device compares the identifier of the first clock source node with the identifier of the second clock source node.

S403: When the identifier of the first clock source node is the same as the identifier of the second clock source node, the network device selects, from the first master clock node and the second master clock node based on the first maximum clock deviation accumulated value and the second maximum clock deviation accumulated value, a master clock node for performing clock synchronization.

It should be noted that content of S401 to S403 in this embodiment is similar to the content of S301 to S303 in the foregoing embodiment. For example implementations of S401 to S403, refer to the descriptions of S301 to S303 in the foregoing embodiment. Details are not described herein again. However, when the first maximum clock deviation accumulated value is equal to the second maximum clock deviation accumulated value, and a third maximum clock deviation accumulated value is equal to a fourth maximum clock deviation accumulated value, a manner in which the network device selects the master clock node for performing clock synchronization in this embodiment is different from the manner in the foregoing embodiment, and this case is described in detail below.

S404: When the first maximum clock deviation accumulated value is equal to the second maximum clock deviation accumulated value, the network device selects, from the first master clock node and the second master clock node based on a first clock variance value and a second clock variance value, the master clock node for performing clock synchronization.

It should be noted that the announce message from the first master clock node may further carry the first clock variance value, and the announce message from the second master clock node may further carry the second clock variance value. The first clock variance value is a square root of a quadratic sum of a plurality of first clock deviation variance values, and the second clock variance value is a square root of a quadratic sum of a plurality of second clock deviation variance values.

In a first case, on a path from a clock source node to a master clock node, a clock deviation may exist only in a clock node. Therefore, for any one of the plurality of first clock deviation variance values, the first clock deviation variance value may be a variance value of a plurality of clock deviations corresponding to one clock node on a path from the first clock source node to the first master clock node. Likewise, for any one of the plurality of second clock deviation variance values, the second clock deviation variance value may be a variance value of a plurality of clock deviations corresponding to one clock node on a path from the second clock source node to the second master clock node. That is, each clock node on the path from the first clock source node to the first master clock node corresponds to a plurality of clock deviations, and a variance value of the plurality of clock deviations is a first clock deviation variance value; and each clock node on the path from the second clock source node to the second master clock node corresponds to a plurality of clock deviations, and a variance value of the plurality of clock deviations is a second clock deviation variance value. In other words, the plurality of first clock deviation variance values are in a one-to-one correspondence with the plurality of clock nodes on the path from the first clock source node to the first master clock node, and the plurality of second clock deviation variance values are in a one-to-one correspondence with the plurality of clock nodes on the path from the second clock source node to the second master clock node.

A clock deviation described in the foregoing embodiment may be a jump amplitude deviation, a jitter deviation, and a static deviation of a clock node. In addition, a maximum clock deviation of a clock node is described in the foregoing embodiment, that is, the maximum clock deviation of the clock node may be a sum of a maximum jump amplitude deviation, a maximum jitter deviation, and a maximum static deviation, or may be a sum of a maximum jitter deviation and a maximum static deviation. Therefore, similarly, a first clock deviation variance value of a clock node may be a variance value of a jump amplitude deviation, a jitter deviation, and a static deviation of the clock node, or may be a variance value of a jitter deviation and a static deviation of the clock node.

The following describes the first clock variance value in the first case by using an example.

Taking the network device 111 in FIG. 1 as an example, if a network device 105 is the first master clock node, a network device 103 is the first clock source node. A path from the network device 103 to the network device 105 further includes a network device 104. The network device 104 corresponds to a first clock deviation variance value 104, and the network device 105 corresponds to a first clock deviation variance value 105. In this case, the first clock variance value is a square root of a quadratic sum of the first clock deviation variance value 104 and the first clock deviation variance value 105.

In a second case, on a path from a clock source node to a master clock node, in addition to a clock deviation in a clock node, a clock deviation may exist in a transmission medium between adjacent clock nodes. Therefore, the plurality of first clock deviation variance values include a variance value of a plurality of clock deviations corresponding to each clock node on a path from the first clock source node to the first master clock node, and a variance value of a plurality of clock deviations corresponding to a transmission medium between each pair of adjacent clock nodes in at least one pair of adjacent clock nodes in a plurality of clock nodes on the path from the first clock source node to the first master clock node. The plurality of second clock deviation variance values include a variance value of a plurality of clock deviations corresponding to each clock node on a path from the second clock source node to the second master clock node, and a variance value of a plurality of clock deviations corresponding to a transmission medium between each pair of adjacent clock nodes in at least one pair of adjacent clock nodes in a plurality of clock nodes on the path from the second clock source node to the second master clock node. In other words, each clock node on the path from the first clock source node to the first master clock node corresponds to one clock deviation variance value, and the transmission medium between each pair of adjacent clock nodes in the at least one pair of adjacent clock nodes corresponds to one clock deviation variance value, which may be referred to as a first clock deviation variance value. Similarly, each clock node on the path from the second clock source node to the second master clock node corresponds to one clock deviation variance value, and the transmission medium between each pair of adjacent clock nodes in the at least one pair of adjacent clock nodes corresponds to one clock deviation variance value, which may be referred to as a second clock deviation variance value.

The following describes the first clock variance value in the second case by using an example.

Taking the network device 111 in FIG. 1 as an example, if a network device 105 is the first master clock node, a network device 103 is the first clock source node. A path from the network device 103 to the network device 105 further includes a network device 104. The network device 104 corresponds to a first clock deviation variance value 104, the network device 105 corresponds to a first clock deviation variance value 105, and a transmission medium n between the network device 104 and the network device 105 corresponds to a first clock deviation variance value n. In this case, the first clock variance value is a square root of a quadratic sum of the first clock deviation variance value 104, the first clock deviation variance value 105, and the first clock deviation variance value n.

In the two different cases, concepts of the first clock variance value and the second clock variance value are different. Therefore, an implementation of selecting, from the first master clock node and the second master clock node based on the first clock variance value and the second clock variance value, the master clock node for performing clock synchronization also varies. The following separately describes selection of the master clock node in two possible implementations. A first possible implementation corresponds to the first case of this step, and a second possible implementation corresponds to the second case of this step.

In the first possible implementation, the network device compares the first clock variance value with the second clock variance value. When the first clock variance value is less than the second clock variance value, the network device determines the first master clock node as the master clock node for performing clock synchronization. When the first clock variance value is greater than the second clock variance value, the network device determines the second master clock node as the master clock node for performing clock synchronization.

It should be noted that, when the first clock variance value is less than the second clock variance value, it indicates that the precision of performing clock synchronization by using the first master clock node is higher than the precision of performing clock synchronization by using the second master clock node. In this case, the network device determines the first master clock node as the master clock node for performing clock synchronization, so that the precision of performing clock synchronization by the network device can be higher. Similarly, when the first clock variance value is greater than the second clock variance value, it indicates that the precision of performing clock synchronization by using the second master clock node is higher than precision of performing clock synchronization by using the first master clock node. In this case, the network device may determine the second master clock node as the master clock node for performing clock synchronization, so that the precision of performing clock synchronization by the network device can be higher.

It should be noted that, if the identifier of the first clock source node is the same as the identifier of the second clock source node, when the first maximum clock deviation accumulated value is equal to the second maximum deviation accumulated value, and the first clock variance value is equal to the second clock variance value, the announce message from the first master clock node may further carry a hop count from the first master clock node to the first clock source node, and the announce message from the second master clock node may further carry a hop count from the second master clock node to the second clock source node. A master clock node for performing clock synchronization by the network device may be selected by comparing the hop count from the first master clock node to the first clock source node with the hop count from the second master clock node to the second clock source node. Because a larger value of the hop count indicates a larger quantity of clock nodes on a path from a master clock node to a clock source node, and a larger quantity of clock nodes brings a larger clock deviation, the precision of performing clock synchronization by using the master clock node is reduced. Therefore, when the hop count from the first master clock node to the first clock source node is less than the hop count from the second master clock node to the second clock source node, it indicates that the precision of performing clock synchronization by using the first master clock node is higher than the precision of performing clock synchronization by using the second master clock node. In this case, the network device may determine the first master clock node as the master clock node for performing clock synchronization. Certainly, when the hop count from the first master clock node to the first clock source node is greater than the hop count from the second master clock node to the second clock source node, it indicates that the precision of performing clock synchronization by using the second master clock node is higher than the precision of performing clock synchronization by using the first master clock node. In this case, the network device may determine the second master clock node as the master clock node for performing clock synchronization.

In the second possible implementation, the network device determines a third clock variance value and a fourth clock variance value, and the network device compares the third clock variance value with the fourth clock variance value. When the third clock variance value is less than the fourth clock variance value, the network device determines the first master clock node as the master clock node for performing clock synchronization. When the third clock variance value is greater than the fourth clock variance value, the network device determines the second master clock node as the master clock node for performing clock synchronization.

It should be noted that the third clock variance value is a square root of a quadratic sum of a variance value of a plurality of clock deviations corresponding to a transmission medium between the first master clock node and the network device and the first clock variance value. The fourth clock variance value is a square root of a quadratic sum of a variance value of a plurality of clock deviations corresponding to a transmission medium between the second master clock node and the network device and the second clock variance value.

Similar to the second possible implementation in S303, in the second possible implementation of this step, when the variance value of the plurality of clock deviations corresponding to the transmission medium between the first master clock node and the network device is stored in the first master clock node, and the variance value of the plurality of clock deviations corresponding to the transmission medium between the second master clock node and the network device is stored in the second master clock node, the first clock deviation variance value carried in the announce message from the first master clock node is a result obtained by considering the variance value of the plurality of clock deviations corresponding to the transmission medium between the first master clock node and the network device, and the second clock deviation variance value carried in the announce message from the second master clock node is a result obtained by considering the variance value of the plurality of clock deviations corresponding to the transmission medium between the second master clock node and the network device. In this case, the first clock deviation variance value may be directly compared with the second clock deviation variance value. When the first clock deviation variance value is less than the second clock deviation variance value, the network device determines the first master clock node as the master clock node for performing clock synchronization. When the first clock deviation variance value is greater than the second clock deviation variance value, the network device determines the second master clock node as the master clock node for performing clock synchronization.

However, when the variance value of the plurality of clock deviations corresponding to the transmission medium between the first master clock node and the network device is stored in the network device, and the variance value of the plurality of clock deviations corresponding to the transmission medium between the second master clock node and the network device is stored in the network device, the variance value of the plurality of clock deviations corresponding to the transmission medium between the first master clock node and the network device is not considered in the first clock deviation variance value carried in the announce message from the first master clock node, and the variance value of the plurality of clock deviations corresponding to the transmission medium between the second master clock node and the network device is not considered in the second clock deviation variance value carried in the announce message from the second master clock node. In this case, a third clock variance value and a fourth clock variance value need to be determined, and the third clock variance value is compared with the fourth clock variance value. When the third clock variance value is less than the fourth clock variance value, the network device determines the first master clock node as the master clock node for performing clock synchronization. When the third clock variance value is greater than the fourth clock variance value, the network device determines the second master clock node as the master clock node for performing clock synchronization.

In addition, when the third clock variance value is less than the fourth clock variance value, it indicates that precision of performing clock synchronization by using the first master clock node is higher than precision of performing clock synchronization by using the second master clock node. In this case, the network device determines the first master clock node as the master clock node for performing clock synchronization, so that precision of performing clock synchronization by the network device can be higher. Similarly, when the third clock variance value is greater than the fourth clock variance value, it indicates that precision of performing clock synchronization by using the second master clock node is higher than precision of performing clock synchronization by using the first master clock node. In this case, the network device determines the second master clock node as the master clock node for performing clock synchronization, so that precision of performing clock synchronization by the network device can be higher.

The following describes the third clock variance value by using an example.

Taking the network device 111 in FIG. 1 as an example, if a network device 105 is the first master clock node, a network device 103 is the first clock source node. A path from the network device 103 to the network device 105 further includes a network device 104. The network device 104 corresponds to a first clock deviation variance value 104, the network device 105 corresponds to a first clock deviation variance value 105, a transmission medium n between the network device 104 and the network device 105 corresponds to a first clock deviation variance value n, and a transmission medium m between the network device 105 and the network device 111 corresponds to a first clock deviation variance value m. In this case, if the first clock variance value is a square root of a quadratic sum of the first clock deviation variance value 104, the first clock deviation variance value 105, and the first clock deviation variance value n, the third clock variance value is a square root of a quadratic sum of the first clock deviation variance value m and the first clock variance value.

It should be noted that, if the identifier of the first clock source node is the same as the identifier of the second clock source node, when the first maximum clock deviation accumulated value is equal to the second maximum deviation accumulated value, and the third clock variance value is equal to the fourth clock variance value, the announce message from the first master clock node may further carry a hop count from the first master clock node to the first clock source node, and the announce message from the second master clock node may further carry a hop count from the second master clock node to the second clock source node. A master clock node for performing clock synchronization by the network device may be selected by comparing the hop count from the first master clock node to the first clock source node with the hop count from the second master clock node to the second clock source node. Because a larger value of the hop count indicates a larger quantity of clock nodes on a path from a master clock node to a clock source node, and a larger quantity of clock nodes brings a larger clock deviation, the precision of performing clock synchronization by using the master clock node is reduced. Therefore, when the hop count from the first master clock node to the first clock source node is less than the hop count from the second master clock node to the second clock source node, it indicates that the precision of performing clock synchronization by using the first master clock node is higher than the precision of performing clock synchronization by using the second master clock node. In this case, the network device may determine the first master clock node as the master clock node for performing clock synchronization. Certainly, when the hop count from the first master clock node to the first clock source node is greater than the hop count from the second master clock node to the second clock source node, it indicates that the precision of performing clock synchronization by using the second master clock node is higher than the precision of performing clock synchronization by using the first master clock node. In this case, the network device may determine the second master clock node as the master clock node for performing clock synchronization.

S405: The network device calibrates a clock of the network device based on the time information of the selected master clock node.

It should be noted that, for an example implementation of S405, refer to the descriptions of S304 in the foregoing embodiment. Details are not described herein again.

It should be noted that, in the foregoing technical solution, clock synchronization is performed when the identifier of the first clock source node is the same as the identifier of the second clock source node. However, when the identifier of the first clock source node is different from the identifier of the second clock source node, a master clock node to be selected to perform clock synchronization with the network device may be determined based on the values of the identifiers of the two clock source nodes. A smaller identifier of a clock source node indicates higher precision of the clock source node, that is, higher precision of performing clock synchronization with a master clock node corresponding to the clock source node. Therefore, a master clock node corresponding to a clock source node with a smaller identifier in the two clock source nodes may be selected as a master clock node for performing clock synchronization by the network device, so that the precision of performing clock synchronization by the network device is higher. Specifically, when the identifier of the first clock source node is less than the identifier of the second clock source node, it indicates that the precision of performing clock synchronization by using the first master clock node is higher than the precision of performing clock synchronization by using the second master clock node. In this case, the network device may determine the first master clock node as the master clock node for performing clock synchronization. When the identifier of the first clock source node is greater than the identifier of the second clock source node, it indicates that the precision of performing clock synchronization by using the second master clock node is higher than the precision of performing clock synchronization by using the first master clock node. In this case, the network device may determine the second master clock node as the master clock node for performing clock synchronization.

Further, the announce message from the first master clock node may further carry a clock grade of the first clock source node, and the announce message from the second master clock node may further carry a clock grade of the second clock source node. Before step S402, that is, before the identifier of the first clock source node is compared with the identifier of the second clock source node, a master clock node to be selected to perform clock synchronization with the network device may be determined by using the following step A to step D.

Step A: The network device compares the clock grade of the first clock source node with the clock grade of the second clock source node. When the clock grade of the first clock source node is equal to the clock grade of the second clock source node, the network device determines whether the clock grade of the first clock source node is less than or equal to 127, and returns to S402 when the clock grade of the first clock source node is greater than 127.

Step B: When the clock grade of the first clock source node is less than or equal to 127, the network device selects, from the first master clock node and the second master clock node based on the first maximum clock deviation accumulated value and the second maximum clock deviation accumulated value, the master clock node for performing clock synchronization.

It should be noted that content of step A and step B in this embodiment is similar to the content of step (1) and step (2) in the foregoing embodiment, and details are not described herein again.

Step C: When the first maximum clock deviation accumulated value is equal to the second maximum clock deviation accumulated value, the network device selects, from the first master clock node and the second master clock node based on the first clock variance value and the second clock variance value, the master clock node for performing clock synchronization.

It should be noted that step C is similar to S404, and details are not described herein again.

Step D: The network device calibrates the clock of the network device based on the time information of the selected master clock node.

It should be noted that step D is similar to S304, and details are not described herein again.

In some embodiments of this application, the network device first receives the announce message from the first master clock node and the announce message from the second master clock node. The announce message from the first master clock node carries the identifier of the first clock source node, the first maximum clock deviation accumulated value, and the first clock variance value, and the announce message from the second master clock node carries the identifier of the second clock source node, the second maximum clock deviation accumulated value, and the second clock variance value. Then, the network device compares the identifier of the first clock source node with the identifier of the second clock source node. When the identifier of the first clock source node is the same as the identifier of the second clock source node, it indicates that the first master clock node and the second master clock node correspond to a same clock source node. In this case, the network device selects, from the first master clock node and the second master clock node based on the first maximum clock deviation accumulated value and the second maximum clock deviation accumulated value, the master clock node for performing clock synchronization. When the first maximum clock deviation accumulated value is equal to the second maximum clock deviation accumulated value, the network device selects, from the first master clock node and the second master clock node based on the first clock variance value and the second clock variance value, the master clock node for performing clock synchronization. Finally, the network device calibrates the clock of the network device based on the time information of the selected master clock node. A smaller clock deviation on a path from a clock source node to a master clock node indicates higher precision of performing clock synchronization by using the master clock node, so that the precision of the calibrated clock of the network device is higher.

Figure 5:
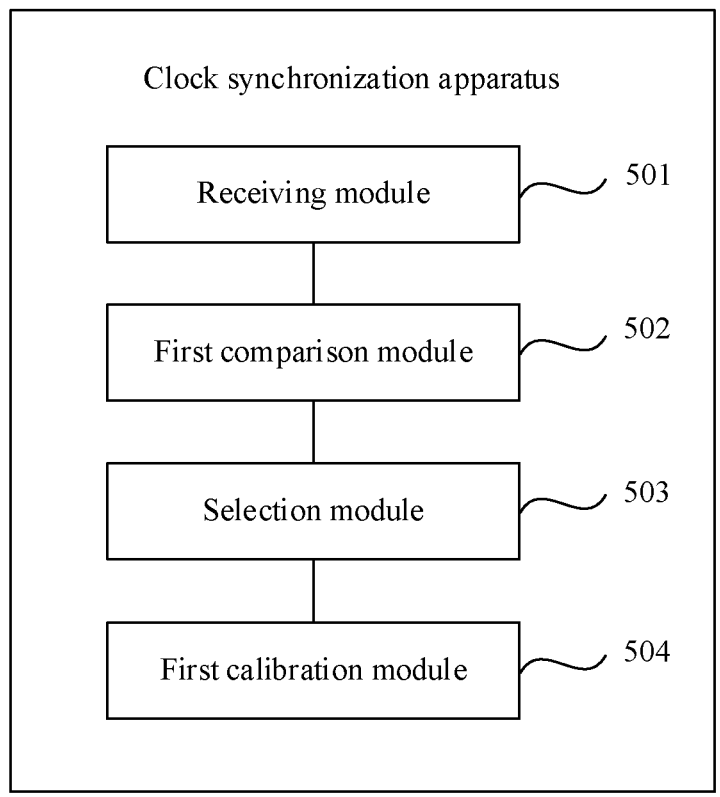
FIG. 5 is a schematic structural diagram of a clock synchronization apparatus according to an embodiment of this application.

FIG. 5 is a schematic structural diagram of a clock synchronization apparatus according to an embodiment of this application. The clock synchronization apparatus may be implemented as a part or all of a computer device by using software, hardware, or a combination thereof. The clock synchronization apparatus is applied to a network device, and the network device may be the network device shown in FIG. 2. Referring to FIG. 5, the apparatus includes a receiving module 501, a first comparison module 502, a selection module 503, and a first calibration module 504.

The receiving module 501 is configured to perform the operation in S301 or the operation in S401.

The first comparison module 502 is configured to perform the operation in S302 or the operation in S402.

The selection module 503 is configured to perform the operation in 5303 or the operation in S403.

The first calibration module 504 is configured to perform the operation in 5304.

Optionally, the plurality of first maximum clock deviations are a plurality of maximum clock deviations respectively corresponding to a plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node.

Optionally, the announce message from the first master clock node further carries a clock grade of the first clock source node, and the announce message from the second master clock node further carries a clock grade of the second clock source node.

The apparatus further includes:

a second comparison module, configured to compare the clock grade of the first clock source node with the clock grade of the second clock source node; and a determining module, configured to: when the clock grade of the first clock source node is equal to the clock grade of the second clock source node, determine whether the clock grade of the first clock source node is less than or equal to 127.

The first comparison module 502 includes:

a first comparison submodule, configured to: when the clock grade of the first clock source node is greater than 127, compare the identifier of the first clock source node with the identifier of the second clock source node.

Optionally, the apparatus further includes:

the selection module 503, further configured to: when the clock grade of the first clock source node is less than or equal to 127, select, from the first master clock node and the second master clock node based on the first maximum clock deviation accumulated value and the second maximum clock deviation accumulated value, the master clock node for performing clock synchronization; and a second calibration module, configured to calibrate the clock of the clock synchronization apparatus based on the time information of the selected master clock node.

Optionally, the plurality of first maximum clock deviations are a plurality of maximum clock deviations respectively corresponding to a plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node.

Optionally, the selection module 503 includes:

a second comparison submodule, configured to compare the first maximum clock deviation accumulated value with the second maximum clock deviation accumulated value; and a first determining submodule, configured to: when the first maximum clock deviation accumulated value is less than the second maximum clock deviation accumulated value, determine the first master clock node as the master clock node for performing clock synchronization.

Optionally, the announce message from the first master clock node further carries a first clock variance value, and the announce message from the second master clock node further carries a second clock variance value. The first clock variance value is a square root of a quadratic sum of a plurality of first clock deviation variance values, and the second clock variance value is a square root of a quadratic sum of a plurality of second clock deviation variance values. The first clock deviation variance value is a variance value of a plurality of clock deviations corresponding to one clock node on the path from the first clock source node to the first master clock node, and the second clock deviation variance value is a variance value of a plurality of clock deviations corresponding to one clock node on the path from the second clock source node to the second master clock node.

The apparatus further includes:

a third comparison module, configured to: when the first maximum clock deviation accumulated value is equal to the second maximum clock deviation accumulated value, compare the first clock variance value with the second clock variance value; and a first determining module, configured to: when the first clock variance value is less than the second clock variance value, determine the first master clock node as the master clock node for performing clock synchronization.

Optionally, the plurality of first maximum clock deviations are a plurality of maximum clock deviations respectively corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

Optionally, the selection module 503 includes:

a second determining submodule, configured to determine a third maximum clock deviation accumulated value and a fourth maximum clock deviation accumulated value, where the third maximum clock deviation accumulated value is a sum of a maximum clock deviation corresponding to a transmission medium between the first master clock node and the clock synchronization apparatus and the first maximum clock deviation accumulated value, and the fourth maximum clock deviation accumulated value is a sum of a maximum clock deviation corresponding to a transmission medium between the second master clock node and the clock synchronization apparatus and the second maximum clock deviation accumulated value;

a third comparison submodule, configured to compare the third maximum clock deviation accumulated value with the fourth maximum clock deviation accumulated value; and a third determining submodule, configured to: when the third maximum clock deviation accumulated value is less than the fourth maximum clock deviation accumulated value, determine the first master clock node as the master clock node for performing clock synchronization.

Optionally, the announce message from the first master clock node further carries a first clock variance value, and the announce message from the second master clock node further carries a second clock variance value. The first clock variance value is a square root of a quadratic sum of a plurality of first clock deviation variance values, and the second clock variance value is a square root of a quadratic sum of a plurality of second clock deviation variance values. The plurality of first clock deviation variance values include a variance value of a plurality of clock deviations corresponding to each clock node on the path from the first clock source node to the first master clock node, and a variance value of a plurality of clock deviations corresponding to a transmission medium between each pair of adjacent clock nodes in the at least one pair of adjacent clock nodes in the plurality of clock nodes on the path from the first clock source node to the first master clock node, and the plurality of second clock deviation variance values include a variance value of a plurality of clock deviations corresponding to each clock node on the path from the second clock source node to the second master clock node, and a variance value of a plurality of clock deviations corresponding to a transmission medium between each pair of adjacent clock nodes in the at least one pair of adjacent clock nodes in the plurality of clock nodes on the path from the second clock source node to the second master clock node.

The apparatus further includes:

a second determining module, configured to: when the third maximum clock deviation accumulated value is equal to the fourth maximum clock deviation accumulated value, determine a third clock variance value and a fourth clock variance value, where the third clock variance value is a square root of a quadratic sum of a variance value of a plurality of clock deviations corresponding to the transmission medium between the first master clock node and the clock synchronization apparatus and the first clock variance value, and the fourth clock variance value is a square root of a quadratic sum of a variance value of a plurality of clock deviations corresponding to the transmission medium between the second master clock node and the clock synchronization apparatus and the second clock variance value;

a fourth comparison module, configured to compare the third clock variance value with the fourth clock variance value; and a third determining module, configured to: when the third clock variance value is less than the fourth clock variance value, determine the first master clock node as the master clock node for performing clock synchronization.

In some embodiments of this application, the network device first receives the announce message from the first master clock node and the announce message from the second master clock node. The announce message from the first master clock node carries the identifier of the first clock source node and the first maximum clock deviation accumulated value, and the announce message from the second master clock node carries the identifier of the second clock source node and the second maximum clock deviation accumulated value. Then, the network device compares the identifier of the first clock source node with the identifier of the second clock source node. When the identifier of the first clock source node is the same as the identifier of the second clock source node, it indicates that the first master clock node and the second master clock node correspond to a same clock source node. In this case, a master clock node with a smaller clock deviation on a path from a clock source node to the master clock node is selected from the first master clock node and the second master clock node based on the first maximum clock deviation accumulated value and the second maximum clock deviation accumulated value, and then the clock of the network device is calibrated based on the time information of the selected master clock node. A smaller clock deviation on a path from a clock source node to a master clock node indicates higher precision of performing clock synchronization by using the master clock node, so that the precision of the calibrated clock of the network device is higher.

It should be noted that, during clock synchronization of the clock synchronization apparatus provided in the foregoing embodiments is described only using division of the foregoing functional modules. In practice, the functions may be allocated to different functional modules for implementation as required. To be specific, an internal structure of an apparatus is divided into different functional modules to implement all or part of the functions described above. In addition, the clock synchronization apparatus provided in the foregoing embodiment and the clock synchronization method embodiment pertain to a same concept. For an example implementation process of the clock synchronization apparatus, refer to the method embodiment. Details are not described herein again.

All or some of the foregoing embodiments may be implemented by means of software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A clock synchronization method, wherein the method comprises:
    receiving, by a network device, a first announce message from a first master clock node and a second announce message from a second master clock node, wherein the first announce message carries a first identifier of a first clock source node and a first maximum clock deviation accumulated value, and the second announce message carries a second identifier of a second clock source node and a second maximum clock deviation accumulated value, wherein the first maximum clock deviation accumulated value is a sum of a plurality of first maximum clock deviations on a path from the first clock source node to the first master clock node, and the second maximum clock deviation accumulated value is a sum of a plurality of second maximum clock deviations on a path from the second clock source node to the second master clock node;
    selecting, by the network device from the first master clock node and the second master clock node and based on determining that the first identifier and the second identifier are the same, and on the first maximum clock deviation accumulated value and the second maximum clock deviation accumulated value, a master clock node for performing clock synchronization; and
    calibrating, by the network device, a clock of the network device based on time information of the selected master clock node.

2. The method according to claim 1, wherein the first announce message further carries a first clock grade of the first clock source node, and the second announce message further carries a second clock grade of the second clock source node;
    the method further comprises:
    when the first clock grade is equal to the second clock grade and when the first clock grade of the first clock source node is greater than 127, comparing, by the network device, the first identifier with the second identifier.

3. The method according to claim 2, wherein the method further comprises:
    when the first clock grade is less than or equal to 127, selecting, by the network device from the first master clock node and the second master clock node and based on the first maximum clock deviation accumulated value and the second maximum clock deviation accumulated value, the master clock node for performing clock synchronization; and
    calibrating, by the network device, the clock of the network device based on the time information of the selected master clock node.

4. The method according to claim 1, wherein the plurality of first maximum clock deviations are a plurality of maximum clock deviations respectively corresponding to a plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node.

5. The method according to claim 1, wherein the plurality of first maximum clock deviations are a plurality of maximum clock deviations respectively corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

6. A clock synchronization apparatus, wherein the apparatus comprises: a memory, storing a program, a processor coupled to the memory, wherein the program implemented by the processor causes the apparatus to:
receive a first announce message from a first master clock node and a second announce message from a second master clock node, wherein the first announce message carries a first identifier of a first clock source node and a first maximum clock deviation accumulated value, and the second announce message carries a second identifier of a second clock source node and a second maximum clock deviation accumulated value, wherein the first maximum clock deviation accumulated value is a sum of a plurality of first maximum clock deviations on a path from the first clock source node to the first master clock node, and the second maximum clock deviation accumulated value is a sum of a plurality of second maximum clock deviations on a path from the second clock source node to the second master clock node;
select, from the first master clock node and the second master clock node based on determining that the first identifier and the second identifier are the same, and on the first maximum clock deviation accumulated value and the second maximum clock deviation accumulated value, a master clock node for performing clock synchronization; and
calibrate a clock of the clock synchronization apparatus based on time information of the selected master clock node.

7. The apparatus according to claim 6, wherein the first announce message further carries a first clock grade of the first clock source node, and the second announce message further carries a second clock grade of the second clock source node;
when the first clock grade is equal to the second clock grade, and when the clock grade of the first clock source node is greater than 127, the program further causes the apparatus to compare the first identifier with the second identifier.

8. The apparatus according to claim 7, wherein the program further causes the apparatus to:
when the clock grade of the first clock source node is less than or equal to 127, select, from the first master clock node and the second master clock node based on the first maximum clock deviation accumulated value and the second maximum clock deviation accumulated value, the master clock node for performing clock synchronization; and
calibrate the clock of the clock synchronization apparatus based on the time information of the selected master clock node.

9. The apparatus according to claim 6, wherein the plurality of first maximum clock deviations are a plurality of maximum clock deviations respectively corresponding to a plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node.

10. The apparatus according to claim 9, wherein the program further causes the apparatus to:
compare the first maximum clock deviation accumulated value with the second maximum clock deviation accumulated value; and
when the first maximum clock deviation accumulated value is less than the second maximum clock deviation accumulated value, determine the first master clock node as the master clock node for performing clock synchronization.

11. The apparatus according to claim 10, wherein the first announce message further carries a first clock variance value, the second announce message further carries a second clock variance value, the first clock variance value is a square root of a quadratic sum of a plurality of first clock deviation variance values, and the second clock variance value is a square root of a quadratic sum of a plurality of second clock deviation variance values, wherein the first clock deviation variance value is a variance value of a plurality of clock deviations corresponding to one clock node on the path from the first clock source node to the first master clock node, and the second clock deviation variance value is a variance value of a plurality of clock deviations corresponding to one clock node on the path from the second clock source node to the second master clock node; and
the program further causes the apparatus to: when the first maximum clock deviation accumulated value is equal to the second maximum clock deviation accumulated value, compare the first clock variance value with the second clock variance value; and
when the first clock variance value is less than the second clock variance value, determine the first master clock node as the master clock node for performing clock synchronization.

12. The apparatus according to claim 6, wherein the plurality of first maximum clock deviations are a plurality of maximum clock deviations respectively corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

13. The apparatus according to claim 12, wherein the program further causes the apparatus to:
determine a third maximum clock deviation accumulated value and a fourth maximum clock deviation accumulated value, wherein the third maximum clock deviation accumulated value is a sum of a maximum clock deviation corresponding to a transmission medium between the first master clock node and the clock synchronization apparatus and the first maximum clock deviation accumulated value, and the fourth maximum clock deviation accumulated value is a sum of a maximum clock deviation corresponding to a transmission medium between the second master clock node and the clock synchronization apparatus and the second maximum clock deviation accumulated value;
compare the third maximum clock deviation accumulated value with the fourth maximum clock deviation accumulated value; and
when the third maximum clock deviation accumulated value is less than the fourth maximum clock deviation accumulated value, determine the first master clock node as the master clock node for performing clock synchronization.

14. The apparatus according to claim 13, wherein the first announce message further carries a first clock variance value, the second announce message further carries a second clock variance value, the first clock variance value is a square root of a quadratic sum of a plurality of first clock deviation variance values, and the second clock variance value is a square root of a quadratic sum of a plurality of second clock deviation variance values, wherein the plurality of first clock deviation variance values comprise a variance value of a plurality of clock deviations corresponding to each clock node on the path from the first clock source node to the first master clock node, and a variance value of a plurality of clock deviations corresponding to a transmission medium between each pair of adjacent clock nodes in the at least one pair of adjacent clock nodes in the plurality of clock nodes on the path from the first clock source node to the first master clock node, and the plurality of second clock deviation variance values comprise a variance value of a plurality of clock deviations corresponding to each clock node on the path from the second clock source node to the second master clock node, and a variance value of a plurality of clock deviations corresponding to a transmission medium between each pair of adjacent clock nodes in the at least one pair of adjacent clock nodes in the plurality of clock nodes on the path from the second clock source node to the second master clock node; and the program further causes the apparatus to:
when the third maximum clock deviation accumulated value is equal to the fourth maximum clock deviation accumulated value, determine a third clock variance value and a fourth clock variance value, wherein the third clock variance value is a square root of a quadratic sum of a variance value of a plurality of clock deviations corresponding to the transmission medium between the first master clock node and the clock synchronization apparatus and the first clock variance value, and the fourth clock variance value is a square root of a quadratic sum of a variance value of a plurality of clock deviations corresponding to the transmission medium between the second master clock node and the clock synchronization apparatus and the second clock variance value;
compare the third clock variance value with the fourth clock variance value; and
when the third clock variance value is less than the fourth clock variance value, determine the first master clock node as the master clock node for performing clock synchronization.

15. A non-transitory computer-readable storage medium, wherein the computer-readable storage medium stores a computer instruction, and when the instruction is executed by a network device, a method comprising the following steps is implemented:
receiving a first announce message from a first master clock node and a second announce message from a second master clock node, wherein the first announce message carries a first identifier of a first clock source node and a first maximum clock deviation accumulated value, and the second announce message carries a second identifier of a second clock source node and a second maximum clock deviation accumulated value, wherein the first maximum clock deviation accumulated value is a sum of a plurality of first maximum clock deviations on a path from the first clock source node to the first master clock node, and the second maximum clock deviation accumulated value is a sum of a plurality of second maximum clock deviations on a path from the second clock source node to the second master clock node;
selecting, by the network device from the first master clock node and the second master clock node and based on determining that the first identifier and the second identifier are the same, and on the first maximum clock deviation accumulated value and the second maximum clock deviation accumulated value, a master clock node for performing clock synchronization; and
calibrating a clock of the network device based on time information of the selected master clock node.

16. The computer-readable storage medium according to claim 15, wherein the first announce message further carries a first clock grade of the first clock source node, and the second announce message further carries a second clock grade of the second clock source node;
the method further comprises:
when the first clock grade is equal to the second clock grade, and when the first clock grade of the first clock source node is greater than 127, comparing, by the network device, the first identifier with the second identifier.

17. The computer-readable storage medium according to claim 16, wherein the method further comprises:
when the first clock grade is less than or equal to 127, selecting, from the first master clock node and the second master clock node based on the first maximum clock deviation accumulated value and the second maximum clock deviation accumulated value, the master clock node for performing clock synchronization; and
calibrating the clock of the network device based on the time information of the selected master clock node.

18. The computer-readable storage medium according to claim 15, wherein the plurality of first maximum clock deviations are a plurality of maximum clock deviations respectively corresponding to a plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node.

19. The computer-readable storage medium according to claim 15, wherein the plurality of first maximum clock deviations are a plurality of maximum clock deviations respectively corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node, and the plurality of second maximum clock deviations are a plurality of maximum clock deviations respectively corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

* * * * *